(12) United States Patent
Ciolfi et al.

(10) Patent No.: US 8,549,470 B2
(45) Date of Patent: Oct. 1, 2013

(54) MULTI-THREADED SUBGRAPH EXECUTION CONTROL IN A GRAPHICAL MODELING ENVIRONMENT

(75) Inventors: John Edward Ciolfi, Wellesley, MA (US); Ramamurthy Mani, Wayland, MA (US); Qu Zhang, Holliston, MA (US)

(73) Assignee: The MathWorks, Inc., Natick, MA (US)

( * ) Notice: Subject to any disclaimer, the term of this patent is extended or adjusted under 35 U.S.C. 154(b) by 703 days.

(21) Appl. No.: 12/634,500

(22) Filed: Dec. 9, 2009

(65) Prior Publication Data

US 2010/0175045 A1    Jul. 8, 2010

Related U.S. Application Data

(60) Provisional application No. 61/121,747, filed on Dec. 11, 2008.

(51) Int. Cl.
*G06F 9/44* (2006.01)

(52) U.S. Cl.
USPC ........................................................ 717/105

(58) Field of Classification Search
None
See application file for complete search history.

(56) References Cited

U.S. PATENT DOCUMENTS

| | | | | |
|---|---|---|---|---|
| 5,999,729 | A * | 12/1999 | Tabloski et al. | 717/105 |
| 6,014,666 | A * | 1/2000 | Helland et al. | 1/1 |
| 6,389,423 | B1 * | 5/2002 | Sakakura | 707/613 |
| 6,941,257 | B2 * | 9/2005 | Roesner et al. | 703/15 |
| 7,069,517 | B2 | 6/2006 | Washington et al. | |
| 7,210,105 | B2 * | 4/2007 | Melamed et al. | 715/779 |
| 7,519,523 | B2 * | 4/2009 | Szpak et al. | 703/13 |
| 7,617,084 | B1 | 11/2009 | Koslow et al. | |
| 7,774,172 | B1 * | 8/2010 | Yunt et al. | 703/2 |
| 7,783,865 | B2 * | 8/2010 | Burdick et al. | 712/227 |
| 7,801,715 | B2 | 9/2010 | Ciolfi et al. | |
| 7,861,217 | B2 * | 12/2010 | Ciolfi | 717/105 |
| 8,046,751 | B1 * | 10/2011 | Avadhanula et al. | 717/156 |
| 8,108,845 | B2 | 1/2012 | Little et al. | |
| 8,131,523 | B1 | 3/2012 | Yunt et al. | |
| 8,140,365 | B2 | 3/2012 | Springorum et al. | |
| 8,266,584 | B2 | 9/2012 | Hartadinata et al. | |
| 2002/0075314 | A1 * | 6/2002 | Seetharaman et al. | 345/781 |

(Continued)

OTHER PUBLICATIONS

Parallel Implementation of EDAs Based on Probabilistic Graphical Models Alexander Mendiburu, Jose A. Lozano, and José Miguel-Alonso. IEEE Transactions on Evolutionary Computation, Vol. 9, No. 4, Aug. 2005.*

(Continued)

*Primary Examiner* — Don Wong
*Assistant Examiner* — Daxin Wu
(74) *Attorney, Agent, or Firm* — Nelson Mullins Riley & Scarborough LLP

(57) ABSTRACT

Exemplary embodiments support multi-threaded subgraph execution control within a graphical modeling or graphical programming environment. In an embodiment, a subgraph may be identified as a subset of blocks within a graphical model, or graphical program, or both. A subgraph initiator may explicitly execute the subgraph while maintaining data dependencies within the subgraph. Explicit signatures may be defined for the subgraph initiator and the subgraph either graphically or textually. Execution control may be branched wherein the data dependencies within the subgraph are maintained. Execution control may be joined together wherein the data dependencies within the subgraph are maintained. Exemplary embodiments may allow subgraphs to execute on different threads within a graphical modeling or programming environment.

13 Claims, 39 Drawing Sheets

(56) References Cited

U.S. PATENT DOCUMENTS

| | | | |
|---|---|---|---|
| 2002/0145629 A1 | 10/2002 | Gabbert et al. | |
| 2003/0016206 A1 | 1/2003 | Taitel | |
| 2003/0088756 A1* | 5/2003 | Vishkin | 712/30 |
| 2004/0255296 A1* | 12/2004 | Schmidt et al. | 718/100 |
| 2006/0005194 A1* | 1/2006 | Kawahara et al. | 718/100 |
| 2006/0026560 A1 | 2/2006 | Kornerup et al. | |
| 2006/0064669 A1 | 3/2006 | Ogilvie et al. | |
| 2006/0143361 A1* | 6/2006 | Kottapalli et al. | 711/100 |
| 2006/0235927 A1* | 10/2006 | Bhakta et al. | 709/204 |
| 2007/0157138 A1* | 7/2007 | Ciolfi et al. | 716/4 |
| 2007/0225951 A1 | 9/2007 | Eryilmaz et al. | |
| 2007/0245273 A1* | 10/2007 | Catthoor et al. | 716/2 |
| 2007/0266329 A1* | 11/2007 | Gaudette | 715/763 |
| 2007/0277151 A1* | 11/2007 | Brunel et al. | 717/113 |
| 2008/0028196 A1* | 1/2008 | Kailas | 712/245 |
| 2008/0059963 A1* | 3/2008 | Foo | 718/100 |
| 2008/0159527 A1 | 7/2008 | Bentley et al. | |
| 2008/0222620 A1 | 9/2008 | Little et al. | |
| 2009/0132993 A1* | 5/2009 | Mani et al. | 717/105 |

OTHER PUBLICATIONS

Dependency Isolation for Thread-based Multi-tier Internet Services, Chu et al., 0-7803-8968-9/05/%20.0(C0 )2005 IEEE.*

A Simulink@-based Approach to System Level Design and Architecture Selection, Lavagno, 1089-6503/00 $10.00 0 2000 IEEE.*

International Preliminary Report on Patentability for Application No. PCT/US2009/067549, dated Feb. 15, 2011.

International Preliminary Report on Patentability for Application No. PCT/US2009/067545, dated Apr. 21, 2011.

Kacsuk, Peter et al., "Designing parallel programs by the graphical language GRAPNEL," Microprocessing and Microprogramming, vol. 41:625-643 (1996).

The Mathworks, "Simulink, Model-Based and System-Based Design, Using Simulink, Version 5," The Mathworks, Inc. (2004).

Invitation to Pay Additional Fees for Application No. PCT/US2009/067545, dated Jul. 21, 2010.

Lavagno, L et al., "A Simulink-based Approach to System Level Design and Architecture Selection," Proceedings of the 26th EUROMICRO Conference, vol. I(1):76-83 (2000).

International Search Report for Application No. PCT/US2009/067549, dated Jul. 6, 2010.

The MathWorks, "Real-Time Workshop, for Use with Simulink, Getting Started, Version 6," The MathWorks, Inc. (2004).

International Search Report and Written Opinion for Application No. PCT/US2009/067545, dated Sep. 21, 2010.

European Office Action for Application No. 09797230.1, 5 pages, dated Jul. 10, 2012.

* cited by examiner

Fig fcn_call_parallel_h1_and_h2.mdl

MULTI-THREADED SUBGRAPH EXECUTION CONTROL IN A GRAPHICAL MODELING ENVIRONMENT

RELATED APPLICATIONS

This application claims the benefit of U.S. Provisional Patent Application Ser. No. 61/121,747 filed Dec. 11, 2008, the contents of which are incorporated by reference herein in their entirety. This application is related to application Ser. No. 12/634,508, entitled "Subgraph Execution Control in a Graphical Modeling Environment," filed Dec. 9, 2009.

BACKGROUND INFORMATION

Various classes of graphical models or graphical programming describe computations that can be performed on application specific computational hardware, such as a computer, microcontroller, field programmable gate array (FPGA), and custom hardware. Examples of graphical models can include time-based block diagrams such as those found within the Simulink® environment from the MathWorks, Inc. Natick Ma, discrete-event diagrams such as those found within the SimEvents® environment from the MathWorks, Inc. and data-flow diagrams. A common characteristic among these various forms of graphical models is that they define semantics on how to execute the diagram.

Historically, engineers and scientists have utilized graphical models in numerous scientific areas such as feedback control theory and signal processing, to study, design, debug, and refine dynamic systems. Dynamic systems are systems whose behaviors change over time. Dynamic systems may be representative of many real-world systems, such as control systems. Graphical modeling has become common technique for designing models of dynamic systems because graphical modeling software packages provide sophisticated software platforms with a rich suite of support tools that makes the analysis and design of dynamic systems efficient, methodical, and cost-effective.

Graphical modeling environments can include one or more graphical models. These graphical models can be described by a graph consisting of nodes (often called blocks) connected by edges (often called lines or signals). The edges form dependencies between the nodes. The nodes generally describe computations, though it is also possible for the edges to have semantic meaning. The semantic behavior of the graphical model is different in each domain. For example, in time-based block diagrams edges represent signal quantities that vary with time (e.g., data signals) and the nodes are blocks representing dynamic systems (e.g., components of a controller). The signals may form a time-based dependency between blocks. In contrast, the semantic behavior in a discrete-event system may differ from the semantic behavior of the time-based model. For example, in a discrete-event system, the edges generally represent entity paths by which entities can travel from node to node. Each node in a discrete-event system may represent an action to perform on the entity. In a data flow diagram, nodes may represent operations. The edges may represent values and the nodes may be executed based upon data availability.

In the above classes of graphical models, it is possible to provide explicit execution control via a control edge connecting a control initiator with a node (or nodes) within a model. The controlled nodes are referred to as a subgraph. For example, Simulink provides function-call and action signals which are used to explicitly control the execution of subsystems or other models. In this existing system, function-call and action signals take precedence over the data signals. Existing techniques may provide desired operating characteristics for graphical models in some situations; however, in other situations models may not operate as desired. For example, data dependencies may be ignored when explicit execution control is used in conventional modeling environments.

BRIEF DESCRIPTION OF THE DRAWINGS

The accompanying drawings, which are incorporated in and constitute a part of this specification, illustrate one or more embodiments of the invention and, together with the description, explain the invention. In the drawings, FIG. 1A—illustrates a prior art graphical model that employs a conventional technique for explicitly controlling execution of subgraphs in a graphical model.

DETAILED DESCRIPTION

Exemplary embodiments are discussed in connection with graphical models created and executed in the Simulink environment (hereinafter "Simulink"). Current or past versions of Simulink will be used to discuss conventional (prior art) techniques for providing execution control over portions of a graphical model. For example, Simulink 7.3 is one example of a conventional application that will be used to present existing techniques. A Simulink-based representation will be used for discussing novel techniques provided by aspects of the invention that provide explicit execution control over portions of a graphical model.

Figure 1A:
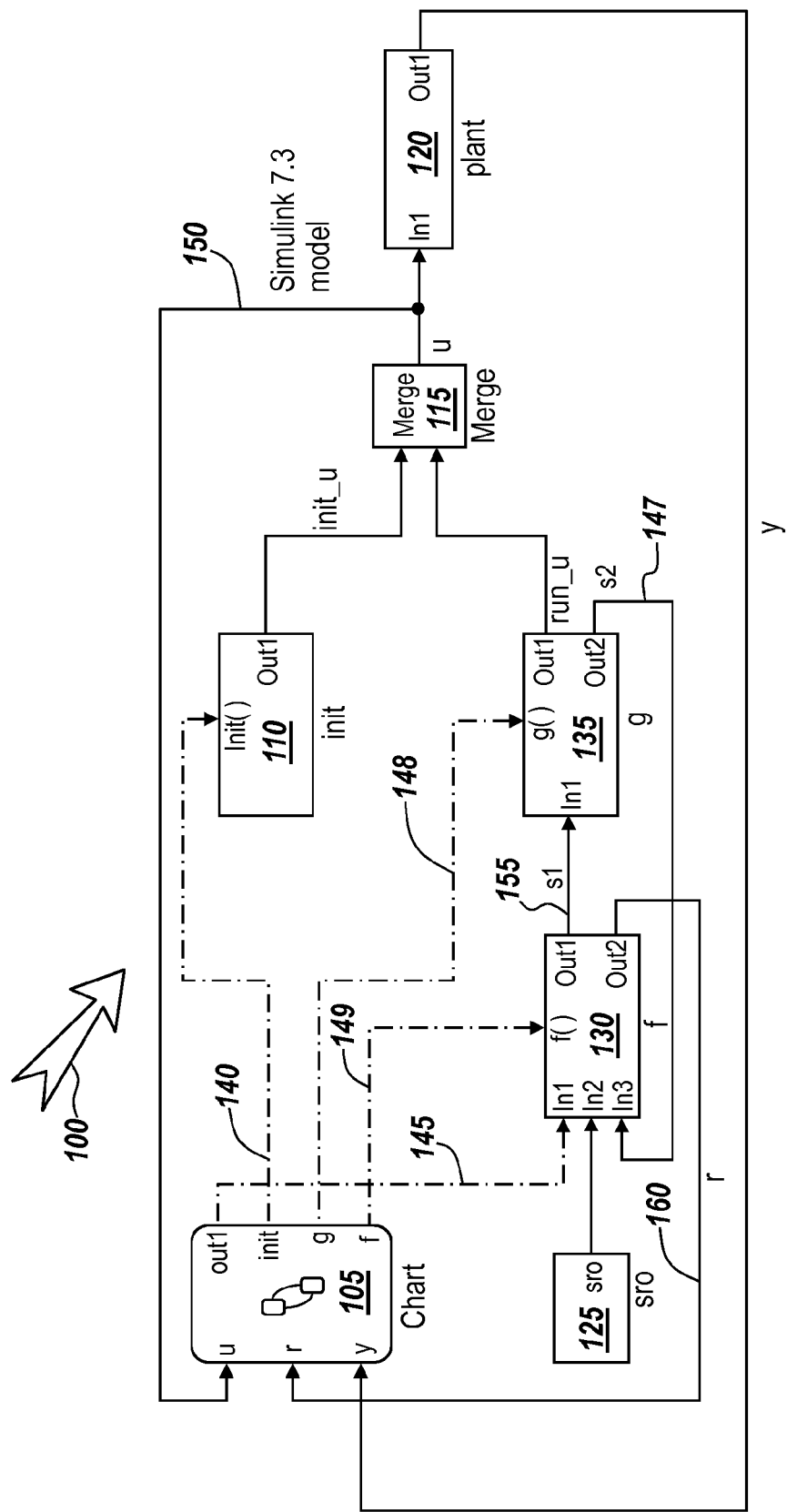
FIG. 1B—illustrates a prior art graphical model that employs a conventional technique for controlling execution of a portion of a model.

Control signals such as function-call or action signals found within Simulink's time-based block diagram environment are used to provide explicit execution control of a portion of a model. Explicitly controlled portions of a model may be referred to as subgraphs. Within a model, a subgraph is a subset of the blocks and the lines connected to the subset of blocks. With conventional modeling techniques, these control signals take precedence over data signals. FIG. 1A illustrates a graphical model that employs a conventional technique for explicitly controlling execution of subgraphs in a graphical model. The model of FIG. 1A was created using Simulink version 7.3 (R2009a). Model 100 represents a control system and can include components (blocks), such as chart 105, init 110, merge 115, plant 120, src 125, f 130, and g 135. In model 100, plant 120 is the entity being controlled (e.g. a car) and the other blocks in model 100 (e.g., chart 105, init 110, merge 115, f 130, and g 135) are used to control plant 120. In model 100, dashed lines, such as signal 140, are control signals, which are referred to as function-call signals within the Simulink 7.3 environment.

A control initiator is a block that uses a control signal to execute one or more destination blocks. For example, in Model 100 chart 105 is a control imitator, which can also be referred to as a function-call initiator, and is responsible for executing function-call subsystems, such as function-call subsystems represented by f 130 and g 135.

In model 100, solid lines, such as signal 145, represent numerical time-varying quantities and can be referred to as data signals. Data signals may represent inputs and outputs to dynamic systems defined by blocks in a model, such as model 100. In a time-based block diagram environment, blocks perform transformations on the data signals. Blocks not explicitly controlled by a control signal initiator, such as chart 105, execute according to time-based semantics, i.e. execute when they have a sample hit.

In model 100, chart 105 may be a Stateflow chart block that contains or implements a finite-state machine responsible for supervisory control of blocks init 110, f 130, and g 135. Chart 105 may run an init function-call subsystem, implemented via init 110, at start-up or when another condition is detected, such as an invalid input (u) to the plant (which may be conveyed to chart 105 via signal 150). In model 100, normal run-time activities of the controller are represented by the function-call subsystem blocks f 130 and g 135. Chart 105 runs init 110, f 130, and g 135 as defined by user-specific state and control-flow logic within the state chart using the function-call control signals 140, 149, and 148.

For example, chart 105 can run the function-call subsystems zero, one, or more times on every time step of model 100 by sending commands via the function-call control signals 140, 149, and 148 to run the function-call subsystems. These commands are realized by run-time functions (e.g. C++ class methods) on the function-call subsystems. Simulink 7.3 will ensure that the output of function of src 125 is executed prior to the output function of chart 105. On a given time-step chart 105 may choose to run f 130 and then immediately run the output and update methods of g 135. In this case, f 130, will see the previous value of output s2 147 (because g's output method has yet to be invoked). g 135 will see the current value of output s1 155 (because f 130 was previously executed). The chart 105, before invoking f 130, will compute signal ' ' 145, where 'i' is an input to f 130. After executing f 130, the chart, 105 can immediately use signal, 'r' 160 in the user-defined chart logic to make other decisions. The signal, r 160, is referred to as a return-value.

As illustrated in the example of model 100, data dependencies implied by signals s1 155 and s2 147 are ignored in determining the order in which f130 and g135 execute—the control signal initiator blocks use the control signals to cause immediate execution of the subsystems f 130 and g 135. Phrased another way, the execution order of subsystems f 130 and g 135 are not dictated by the data signals connecting them but instead by the explicit control signal invocations of Chart 105.

Figure 1B:
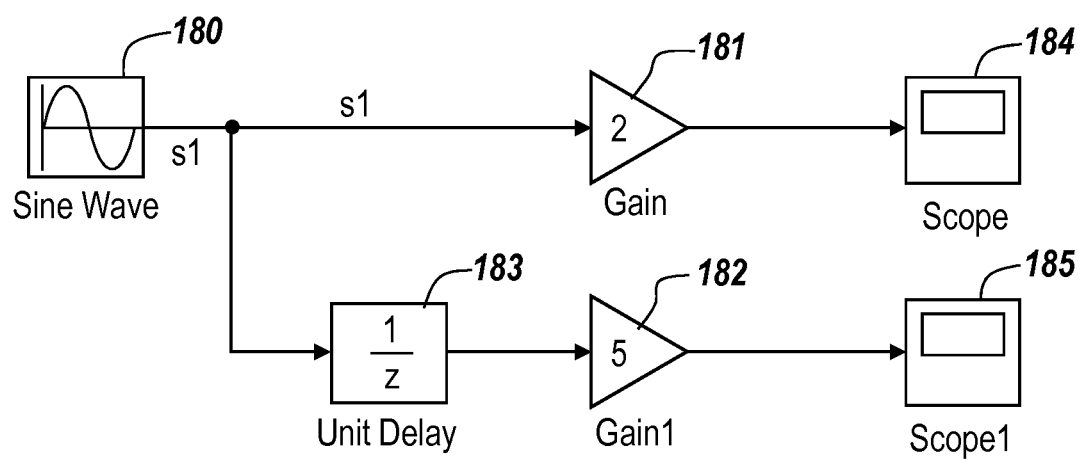

The explicit control of subgraphs contrasts with conventional execution in a Simulink block diagram that follows data dependency order. Consider the example of FIG. 1B. Referring now to FIG. 1B, the Sine Wave block 180 always executes before the Gain block 181, and Gain block 181 always executes before the Scope block 184. The blocks in FIG. 1B are said to execute in the order of their data dependencies. Any delays in the reading of data during execution need to be introduced explicitly as shown in FIG. 1B where the block Gain 1 182 reads a delayed value of signal s1, where the delayed value of signal s1 is produced using unit delay block 183.

The behavior described in connection with FIG. 1B contrasts with the semantic defined by explicit execution control consistent with aspects of the invention. While the explicit execution control semantic is well-defined, it can result in unexpected behavior for users that are familiar with execution that is based upon data dependencies. In the case of explicit execution control, some signals experience delays even when no explicit Delay block was introduced in the model. This unexpected behavior can be especially difficult to trace when constructing large models consisting of many thousands of blocks. For example, it may be difficult for a user to understand when a given function-call subsystem is executing using current input signal values or delayed (previous value) input signal values when the user is working with conventional modeling environments. The phrase "data dependencies are not satisfied" is used herein to indicate situations and/or examples where a delay may be introduced as a result of explicit execution control.

Chart 105 may be generally referred to as a control initiator. A control initiator block has one or more control signal outputs that are used to explicitly invoke destination blocks. Referring back to model 100, chart 105 has three control signal outputs, signal 140 to init 110, signal 149 to f 130, and signal 148 to g 135. These control signals are referred to as function-call signals. Function-call signals are one form of a control signal. Simulink 7.3 also contains action signals which are control signals that come from a control initiator, which is either a Switch Case or If block. Concepts described herein can be extended to classes of signals discussed in connection with disclosed embodiments consistent with the principles of the invention.

While the behavior of Simulink 7.3 and other conventional types of graphical environments is well-defined, there may be a need to ensure data dependencies are satisfied during model execution, while also allowing for explicit execution control. To enable explicit execution control, while satisfying data dependencies, an exemplary embodiment employs a novel semantic via a Control Signal Split block. In general a Control Signal Split (or equivalently a Control Signal Branch block) block can accept a control-signal and then in turn execute one or more destination blocks. A Control Signal Split block can be realized in an embodiment as a Function-Call Split block.

A Function-Call Split block may be a block that accepts a function-call signal and splits (branches) it into two or more function-call signals. When a function-call invocation (message) is received at the input port to the Function-Call Split block, function-calls are initiated at all outputs. These resulting function-calls are executed in a manner such that data dependencies are satisfied. In another embodiment, a Function-Call Split block may be realized as an Action Split block that accepts an Action signal and splits (branches) the action signal into two or more action signals that invoke Action subsystems.

Figure 2:
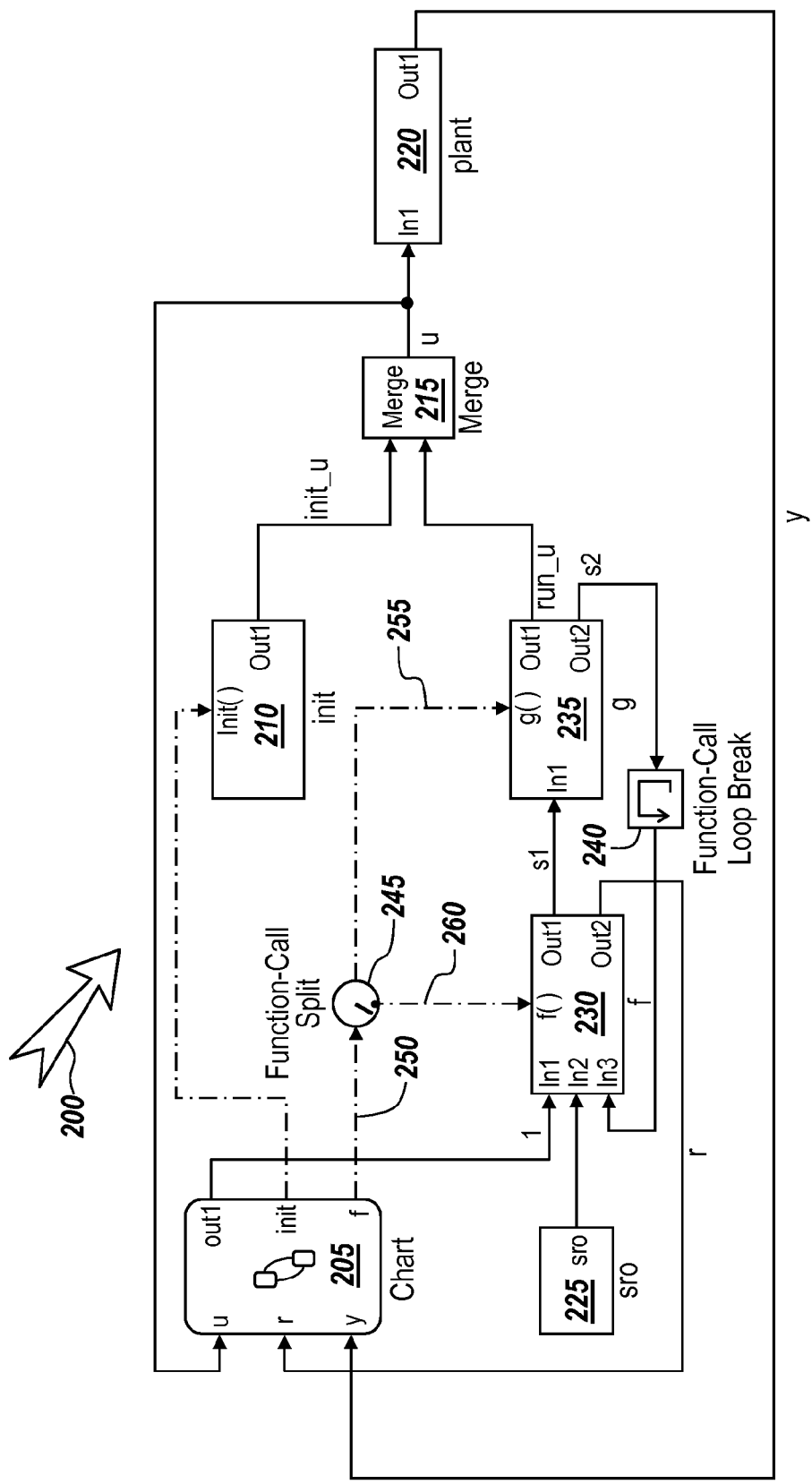
FIG. 2—illustrates an embodiment containing a graphical model that includes a Function-Call Split block, which creates a subgraph that is explicitly controlled while honoring data dependencies.

FIG. 2 illustrates an embodiment containing a graphical model that includes a Function-Call Split block, 245, which creates a subgraph whose execution is explicitly controlled while honoring data dependencies. FIG. 2 illustrates model 200 that can include chart 205, function call subsystems init 210, f 230 and g 235, src block 225, merge block 215, plant subsystem 220, function-call loop break block 240 and Function-Call Split block 245. In model 200, f 230, g 235 and the Function-call Loop Break block 240 form a subgraph where execution of the subgraph is explicitly controlled by the function-call signal f 250 from the chart 205. Within model 200, two types of control signals may be defined, namely function-call signals and action signals. In model 200, a control signal may define when subordinate blocks as identified by the subgraph are executed. In model 200, a control initiator may initiate execution of the subgraph. By way of example, chart 205 is the control initiator in FIG. 2 (often referred to as a function-call initiator) and the signals connected to the output ports, f and init of chart 205 are control signals (of specific type function-call). In FIG. 2, there are two subgraphs, the init Function-call Subsystem that includes init 210 and the subgraph consisting of the Function-call Subsystems, f 230, g 235, and the Function-call Loop Break block 240.

Function-call Loop Break block 240 can be realized in a variety of ways, such as via a Unit Delay or Memory block which outputs a prior value of the signal by maintaining state within the block. The Function-call Loop Break block 240 must run at the same rate as the other blocks in the subgraph. Another realization of the Function-call Loop Break block 240 can be realized by eliminating the need for the Function-call Loop break block 240 and by providing a parameter on the Inport block of the function-call subsystem that allows feedback.

The Function-call Split block 245 'branches' the function-call control signal connected to the output port f of the chart 205 into two respective signals, g 255 and f 260. The Function-call Split block 245 can be configured to execute the out-going function-call control signals (in this case f and g) in any desired order based on a user specification. In FIG. 2, the Function-call Split block 245 executes f 230 first and then g 235 second. The Function-call Loop Break block 240 provides the Function-call Subsystem, f 230 with the previous value of s2 from g 235. If the Function-call Loop Break block 240 were not present, there would be an algebraic loop involving the two Function-call Subsystems, f 230 and g 235. This would result in an error condition unless the algebraic conditions are solved using an algebraic loop solver.

Figure 3A:
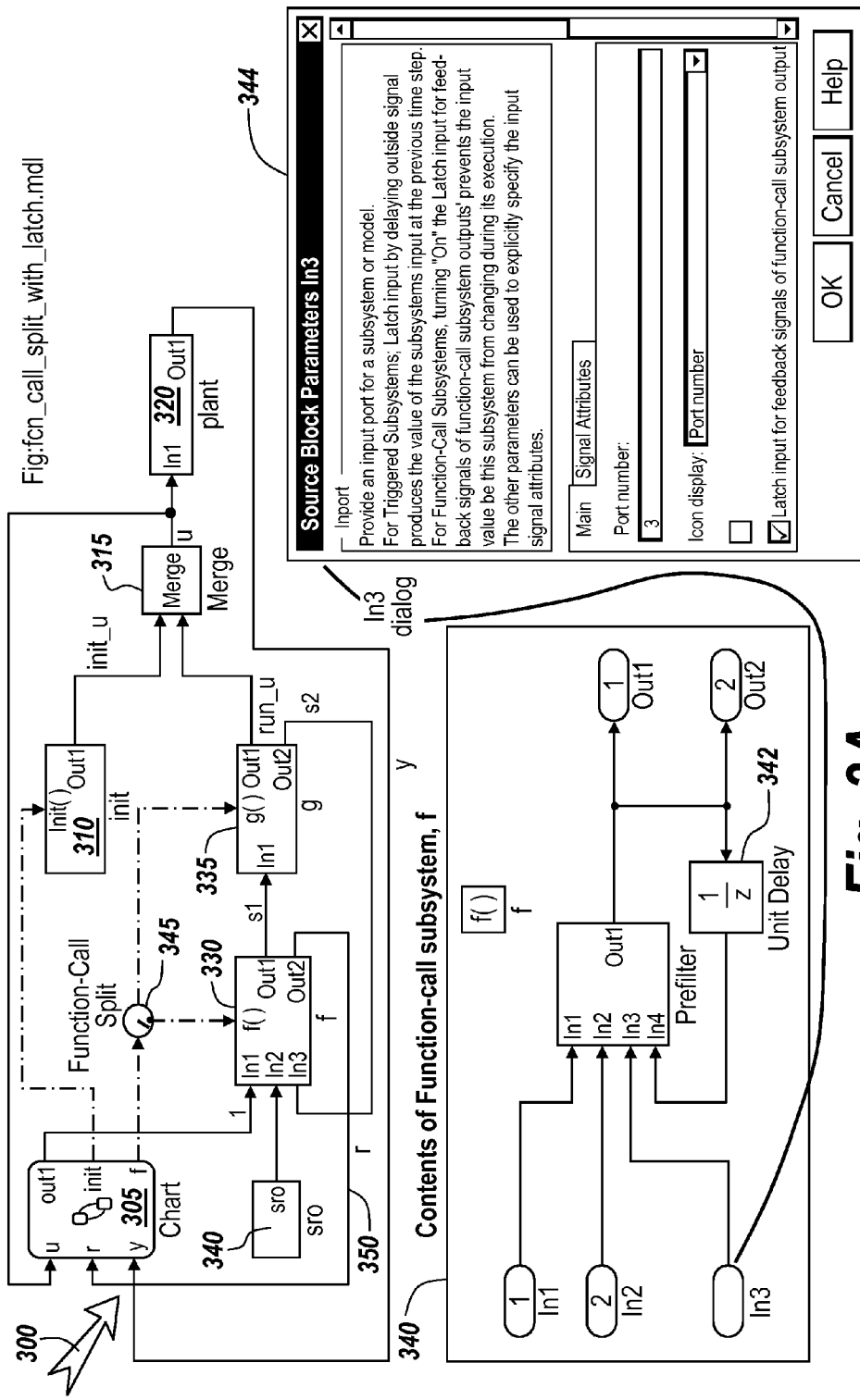
FIGS. 3A-3C—illustrate embodiments containing graphical models that include a Function-Call Split block, which creates a subgraph that is explicitly controlled while honoring data dependencies where the subgraph has a loop that is broken by latching an input of a function-call subsystem.

FIG. 3A illustrates an embodiment containing a graphical model that includes a Function-Call Split block, 345, which creates a subgraph whose execution is explicitly controlled while honoring data dependencies where the subgraph has a loop consisting of signals s1 and s2 where the loop is broken by latching the $3^{rd}$ input of 330. The latching is achieved by selecting the "Latch input for feedback signals of function-call subsystems outputs" parameter on the Inport block dialog of the Function-Call Subsystem, f 330. In the embodiment of FIG. 3A, the Function-Call subsystem, f 330, has indicated that the $3^{rd}$ input (In3) is latched, meaning that f 330 specified that it is using the prior value of the signal feedback from function-call subsystem g 335. The specification is done by opening the Function-call subsystem, f 330 and setting the "Latch input for feedback signals of function-call subsystems" on the Inport block, In3. In FIG. 3, dialog window 344 may be used to specify the latch input. Specifying the loop break property on the subordinate blocks (in this case, f 330) has the advantage over the Loop break blocks in that documentation of the system is improved. For example, in FIG. 3A it may be clear to a model designer that f 330 is using a latched value at input port 3 from the prior execution of g 335 via signal s2 because of the <Li> annotation on 330.

Figure 3B:
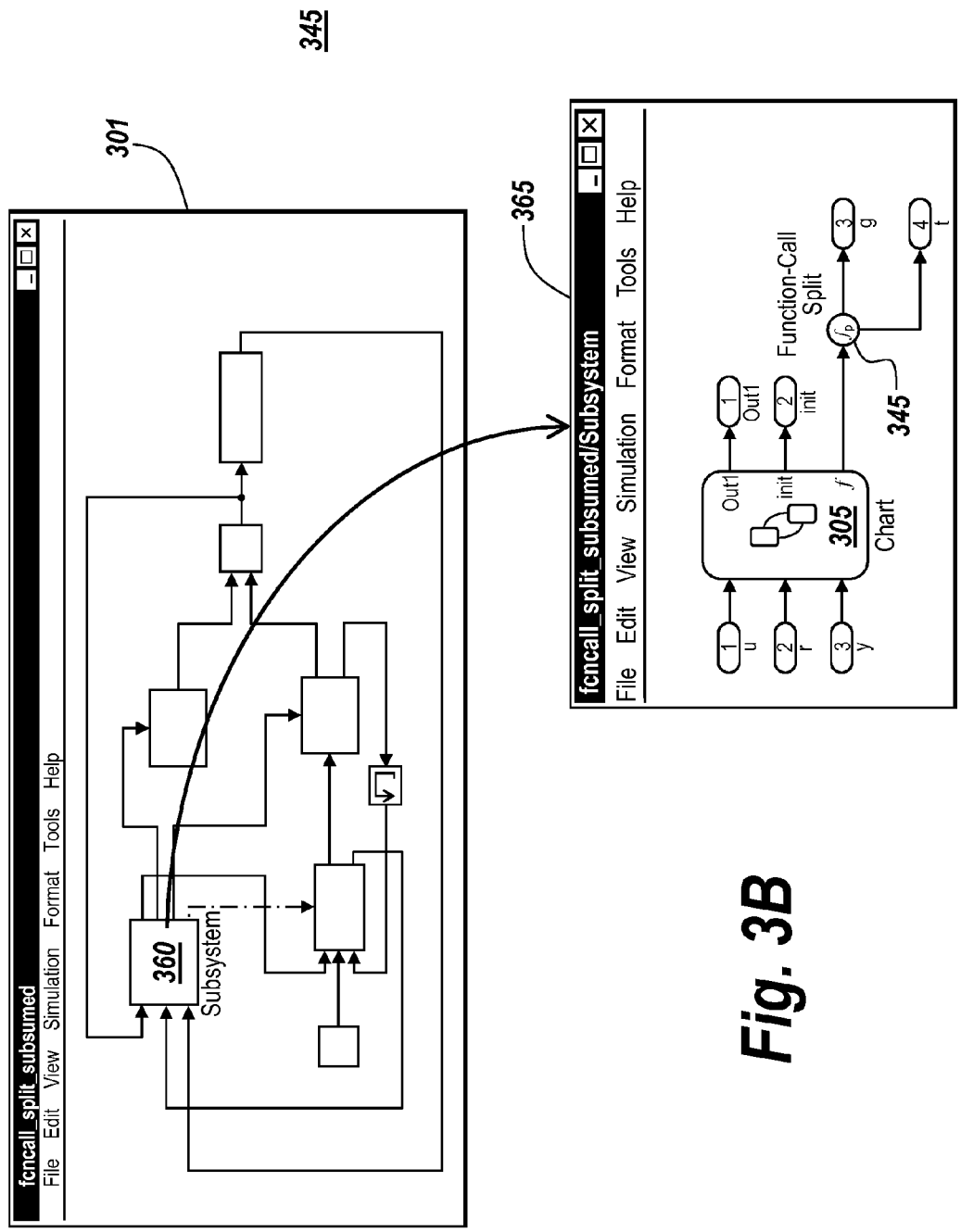
Figure 3C:
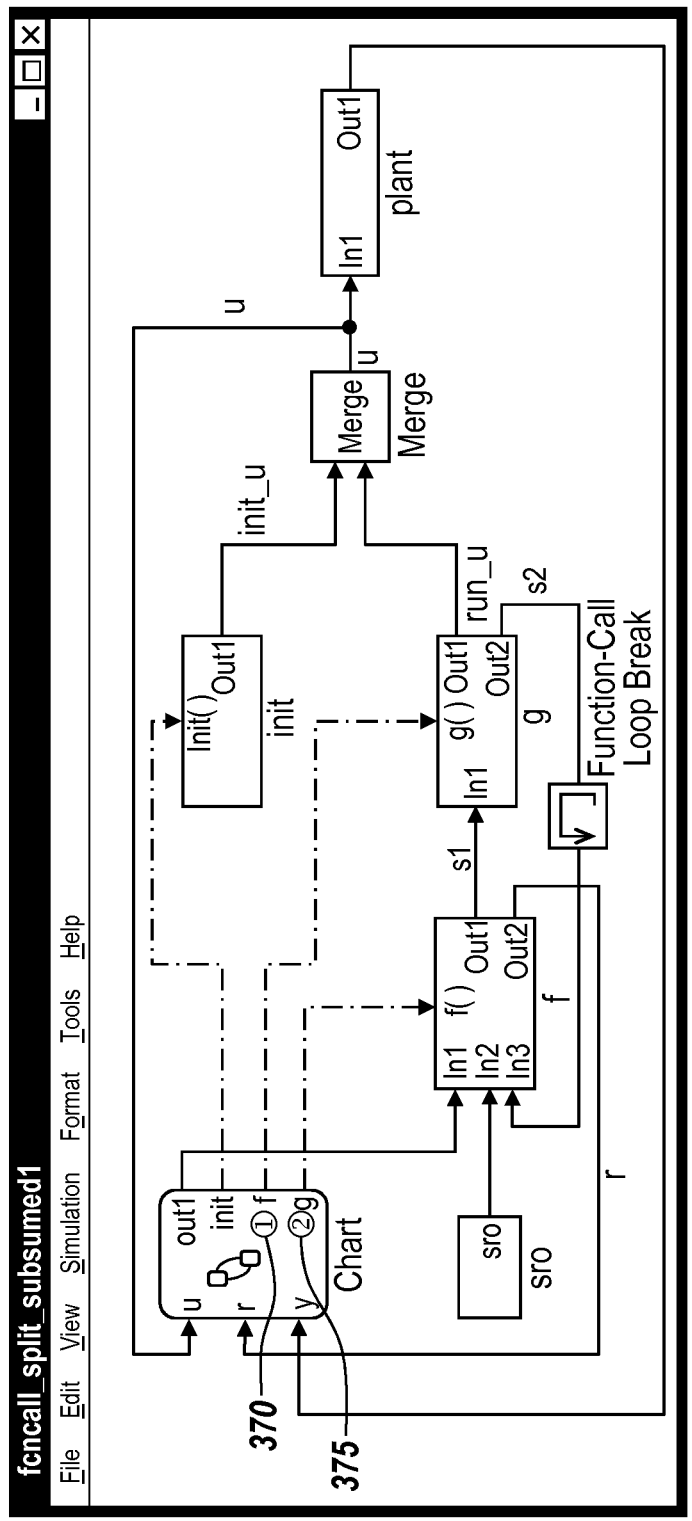

An embodiment illustrated in FIG. 3B can represent an improvement over the pattern explored in FIG. 3A, namely that the Function-Call Split block can be entirely subsumed into the functionality of the Initiator. FIG. 3B illustrates how the Chart 305 and the Split block 345, of FIG. 3A, are subsumed into the single hierarchical level of the model 360. Further, as illustrated in FIG. 3C, the entire Chart 305 can be programmed to subsume the functionality of the Split block 345 without introducing an explicit Split block shown in the model. For example, and referring to FIG. 3C, the fact that f executes before g is indicated by the number 1 near the f port 370 of the Chart and the number 2 near the g port 375 of the Chart. The representation of FIG. 3C may represent an improvement that allows f and g to execute in accordance to their data dependencies. The example of FIGS. 3A, B, and C contrast with the example shown in FIG. 1A where the f 130 and g 135 could execute in any arbitrary order dictated by the Chart.

Figure 4:
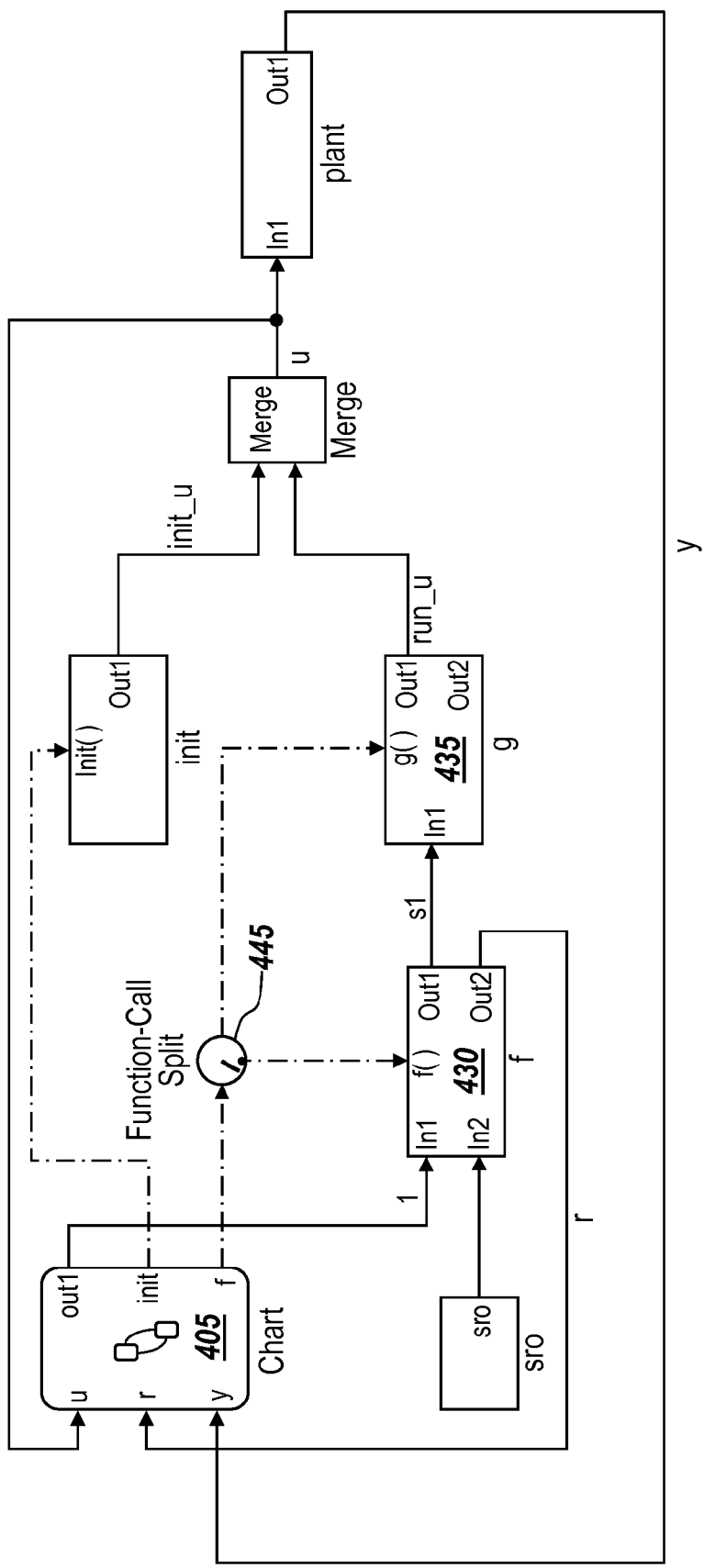
FIG. 4—illustrates the model of FIG. 3A where there is no need to break a loop within an explicitly controlled subgraph.

Embodiments can return processed results from all or any subgraphs connected to a Function-Call Split block back to the Initiator of the function-call control signal. This is illustrated in FIG. 4 where f 430 returns a signal r to the Chart 405. Use of signals, such as r, does not require the use of a loop break block because there is no implied delay in the signal. This concept can be extended to return a value from g 435 as well. The Chart can then use these two values to control the Plant.

Figure 5:
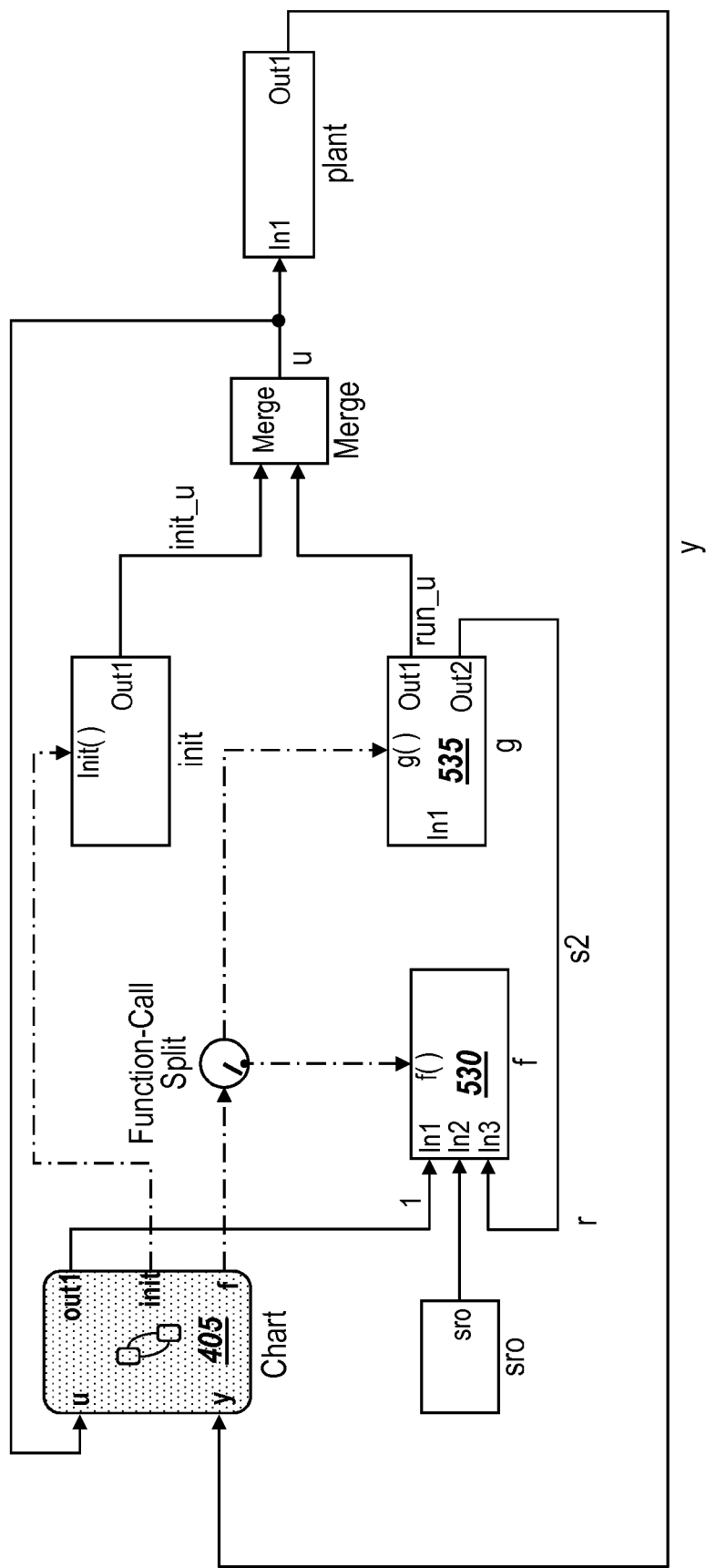
FIG. 5—illustrates an embodiment where a data dependency violation exists within an explicitly controlled subgraph.
Figure 6:
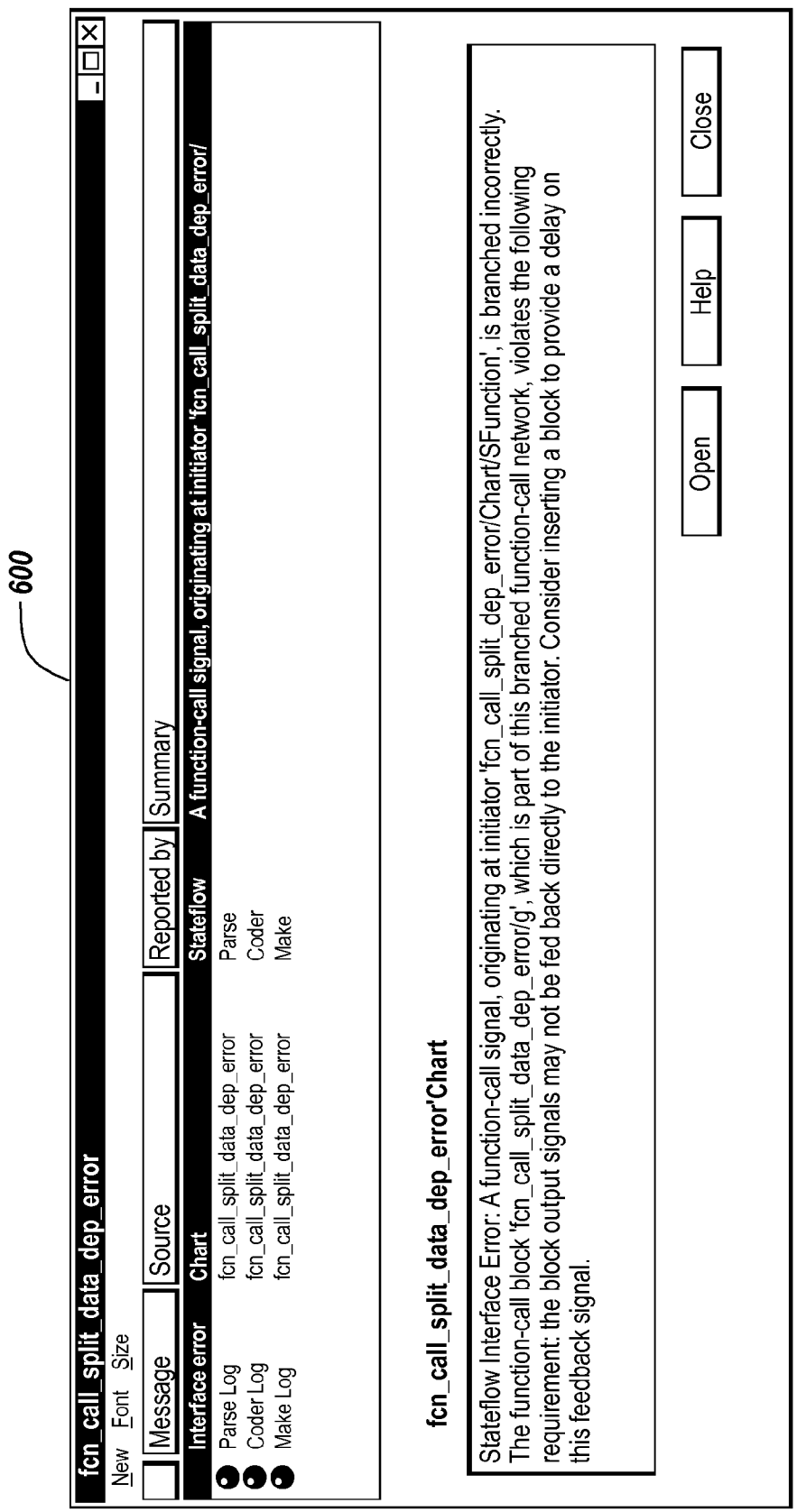
FIG. 6—illustrates a user interface for displaying information about an error in the model of FIG. 5.

In certain situations, a conflict may be created between explicit subgraph execution control and execution ordering determined by data dependencies. When this situation occurs, an error may be produced as shown in FIG. 5 at chart 405 via the shaded fill pattern. The error may also cause an error log to be produced and displayed via a user interface. An exemplary error log that can accompany the graphically depicted error of FIG. 5 is illustrated in FIG. 6 via window 600. If a user were to specify on the Function-Call Split block that the right function-call output executes before the bottom function-call output (with dot showing next to the right function-call output), then data dependencies would be satisfied because the Function-Call Subsystem, g would execute before the Function-Call Subsystem, f and the model would execute without error.

The need for explicit execution control of subgraphs arises in many situations where explicit ordering (often referred to as sequencing or scheduling) of the subgraphs enables supervisory control. For example, one subgraph may represent activities to be performed at initialization and another subgraph may represent run-time behavior. In the example of FIG. 3A, the initialization subgraph defined by the init Function-Call Subsystem is executed when the system starts up or is reset while running. Within a subgraph that is explicitly controlled, it may further be desired that data dependencies are satisfied ensuring each block within the subgraph is operating on current (e.g., up-to-date) information. Referring back to FIG. 3A, the subgraph starting at the Function-Call Split block, 345 represent run-time dynamics that control the plant 320 and within this subgraph, data dependencies are satisfied.

Explicit control of subgraphs can provide at least two capabilities for the model designer:
(1) modeling of systems where there needs to be explicit scheduling of subsystems by elements of a block-diagram, which can be referred to as supervisory control, and
(2) modeling of systems where certain block diagram elements need to perform auxiliary intermediate computations that are needed for performing their overall computation, which can be referred to as external function invocation.

These capabilities are provided by explicit control of subgraphs can used separately or together as shown in FIG. 3A. Referring back to FIG. 3A, based upon the state of the system, chart 305 invokes either the initialization function-call subsystem, init 310, or the run-time logic consisting of the subgraph consisting of the Function-Call Split block 345, and f 330 and g 335 Function-Call Subsystems. This type of decision making can be referred to as supervisory control. In addition the chart uses the signal r 350, computed by the function-call subsystem f 330. In this context the chart is making an external function invocation and using r 350 for further processing.

Figure 7:
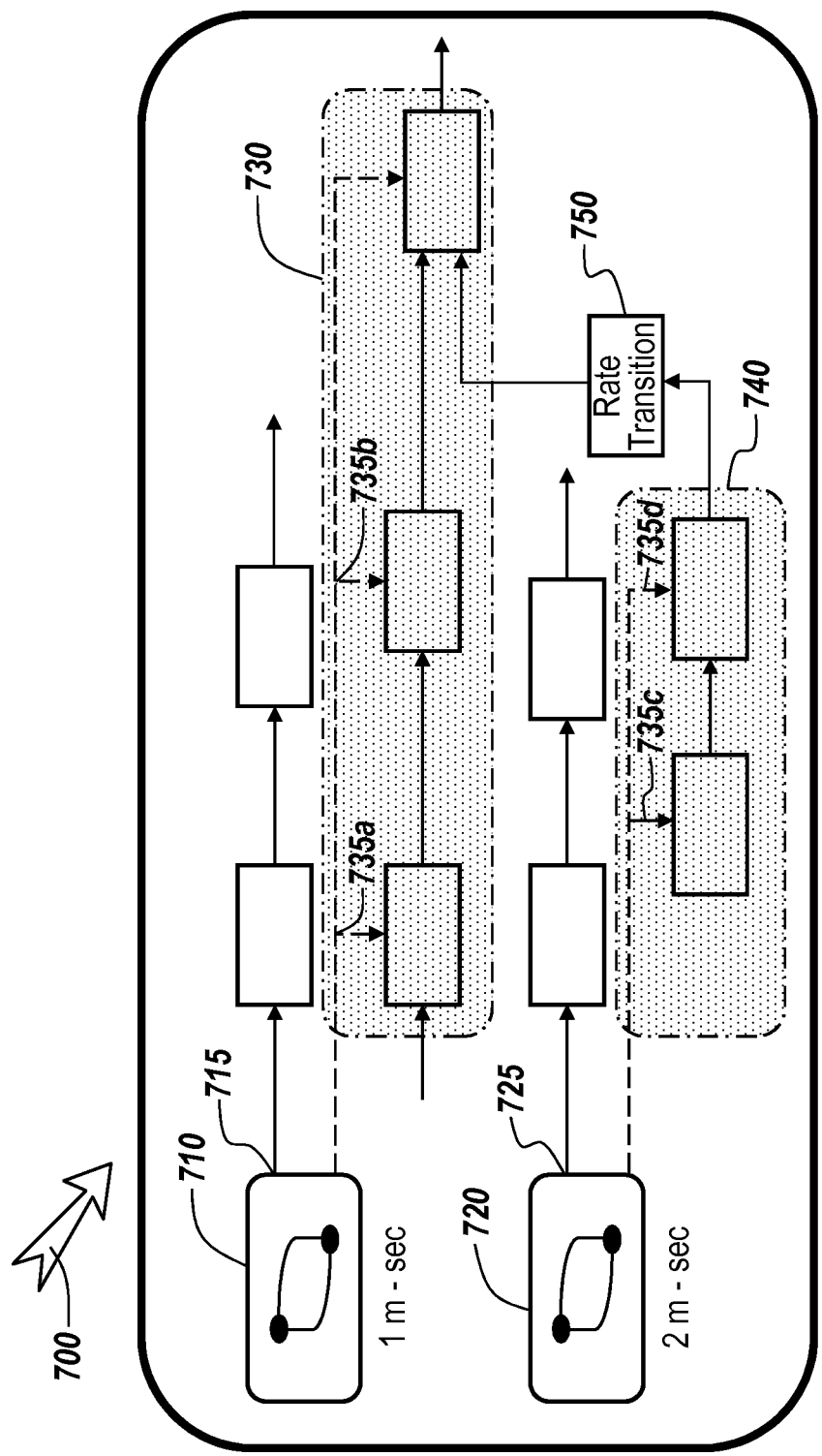
FIG. 7—illustrates an embodiment that performs supervisory control using explicit subgraph control of two separate subgraphs running at different rates.

FIG. 7 illustrates an embodiment that performs supervisory control using explicit subgraph control of two separate subgraphs running at different rates. In FIG. 7, there are two separate charts, namely chart 710 and chart 720, responsible for supervisory control of two separate subgraphs, subgraph 730 and subgraph 740, respectively. In an embodiment, Charts 710 and 720 can further produce periodic signals. In this figure, the 1 m-sec (one millisecond) chart 710 produces a periodic signal at its first output port 715. This signal is transformed by blocks and used elsewhere in the model.

Similarly the 2 m-sec chart 720 produces a periodic signal at its first output port 725 which is used elsewhere in the model. The second output port 717 of chart 710 is then connected to subgraph 730 consisting of three blocks. The 1 m-sec chart 710 on every (1 m-sec) time step decides if it should execute subgraph 730. When chart 710 executes subgraph 730, all three blocks in subgraph 730 execute while satisfying data dependencies, i.e., the 3 blocks of subgraph 730 are evaluated left to right because of data dependencies. In subgraph 730, the size of the execution control split block (in this case a Function-Call Split block 735) has been reduced to a very small dot representing a branch-point. Likewise, the 2 m-sec chart 720 executes the subgraph 740 connected to its second output port 727 based on logic, which may or may not run the subgraph 740 on the 2 m-sec timestep. A Rate Transition block 750 is used to convert the data from the 2 m-sec task to the 1 m-sec task. The Function-Call Split block 735 decides the order in which the subordinate blocks are executed.

Figure 8:
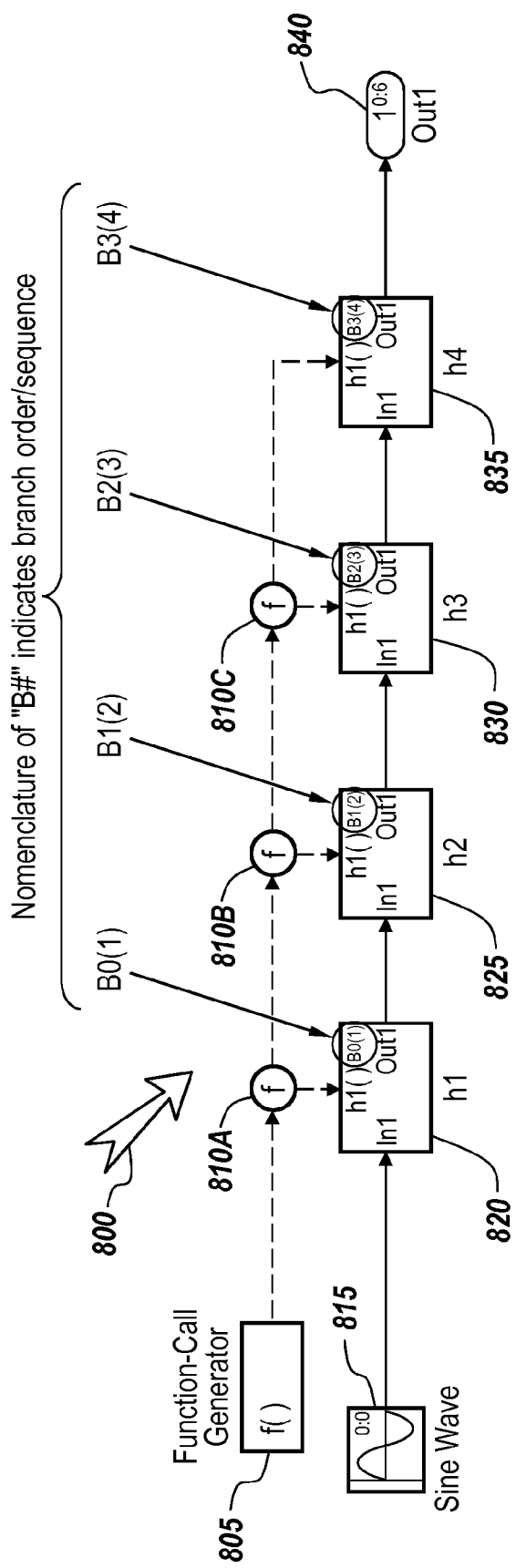
FIG. 8—illustrates an embodiment that includes Function-Call Split blocks that can be configured to invoke a subgraph according to data dependencies and the ordering of the blocks within the subgraph is annotated on the blocks after analyzing the model.

FIG. 8 illustrates an embodiment 800 that includes Function-Call Split blocks 810A, B, C that can be configured to invoke a subgraph according to data dependencies and the ordering of the blocks within the subgraph is annotated on the blocks after analyzing the model. FIG. 8 can include function call generator 805, Function-Call Split block 810A, B, and C, sine wave generator 815, function call subsystems 820, 825, 830 and 835, and output 840. Subsystems 820, 825, 830 and 835 may be subordinate function-call subsystems in an embodiment. These subsystems can optionally be annotated using a nomenclature, such as "B#", where "#" is an integer indicating the execution ordering sequence for the subsystems. For example, in FIG. 8, subsystem 820 may execute first, subsystem 825 may execute second, subsystem 830 may execute third and subsystem 835 may execute fourth, or last.

The ordering of how subsystems execute can be represented using alternative graphical techniques. An example of an alternative technique for representing an explicit ordering for subsystem execution is illustrated in FIG. 9.

Figure 9:
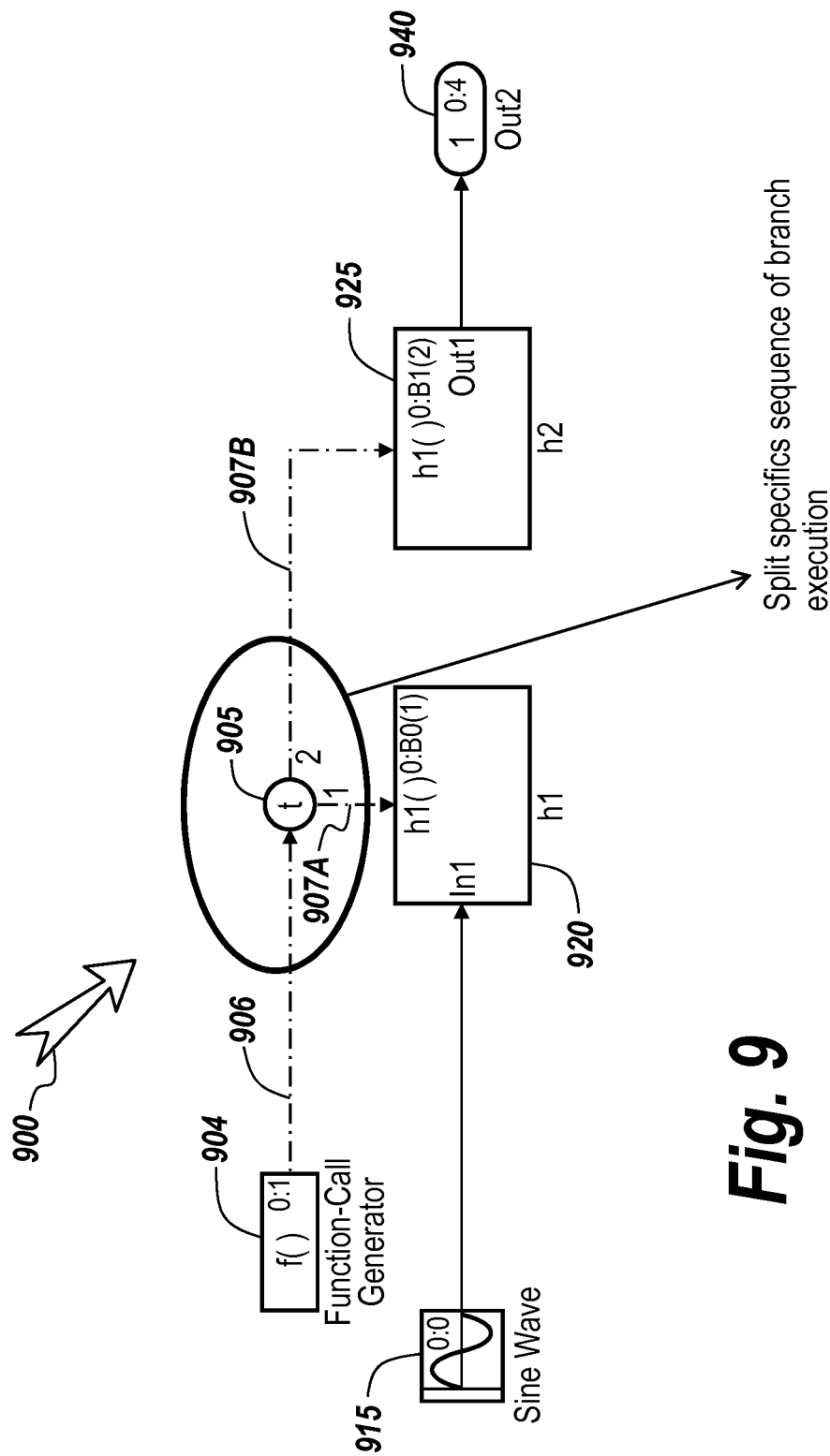
FIG. 9—illustrates an embodiment that includes a Function-Call Split block where the ordering of the outgoing function-calls is annotated using numerical identifiers.

FIG. 9 includes Function-Call Split block 905 that receives signal 906 from function call generator 904. Function-call split block 905 includes two output signals identified using "1" for signal 907A that goes to subsystem 920 and "2" for signal 907B that goes to subsystem 925. In FIG. 9, Function-Call Split block 905 includes a graphical representation in the form of a dot proximate to where signal 907A intersects the border of Function-Call Split block 905. The dot indicates which function-call branch is executed first, namely the one for signal 907A. The "1" next to the signal indicates Function-Call Subsystem h1 runs first and the "2" next to the other signal indicates Function-Call Subsystem h2 runs second. When cascaded Function-Call Split blocks are used for splitting a function-call signal to call more than two function-call subsystems, users may also choose to show absolute execution sequence (like "1", "2", "3"...) or hierarchical execution sequence (such as "1.1.2", "1.2.1"). Users can manually insert a Function-Call Split block to branch a function-call signal, or can simply branch a function-call signal and a Function-Call Split block will be automatically added.

In FIG. 9 a round subgraph block is used and represents one exemplary technique for graphically representing functionality associated with subgraph control. Other embodiments can use other techniques (e.g., shapes) for representing subgraph blocks or subgraph functionality. For example, a rectangular block or another shape block could be used. Furthermore, if there are no options, a simple branch (i.e., no block) may be used to represent the concept of a Function-Call Split. Similarly, an implementation may include more than two output signals, i.e. it is possible to split a function-call into 3 function-call signals by either cascading two Function-Call Split blocks or providing a split block that has 3 outputs.

If a user were to instruct the Function-Call Split block 905 to execute its branches according to data dependencies in this model, there would be ambiguities because there is no dependency between h1 and h2. In this case an error message would be generated indicating that insufficient data dependencies exist in model 900 to ensure a unique execution ordering. If there are no ambiguities and a unique ordering can be found, as in FIG. 8, choosing a branch ordering based on data dependency can result in deterministic execution sequencing.

A Control Signal Split block can be referred to using different names according to environments in which the block is used and/or according to particular functionality implemented using the block. For example, in a Simulink environment, when used with Function-Call signals, the block may be referred to as the Function-Call Split block, Function-Call Branch block, Function-Call Branch Point block, Function-Call Split Junction block, Function-Call Splitter, etc. When used with Simulink's action signals the Control Signal Split block may be referred to as the Action Branch Point block, Action Branch block, Action Split block, Action Split Junction block, Action Splitter, etc.

A subgraph loop break block can also be referred to using different names. For example, in a Simulink environment, when used with Function-Call signals, it may be referred to as the Function-Call Loop Break block, when used with action signals (similar to function-call signals), it may be referred to as the Action Loop Break block. Alternatively, the term loop break may be replaced with "memory" or "delay" or "latch". It should be recognized that several different names can be used to describe this block. The property of breaking loops can also be realized as a parameter (property) of the subordinate blocks that are executed (run) by the control initiator.

Figure 10:
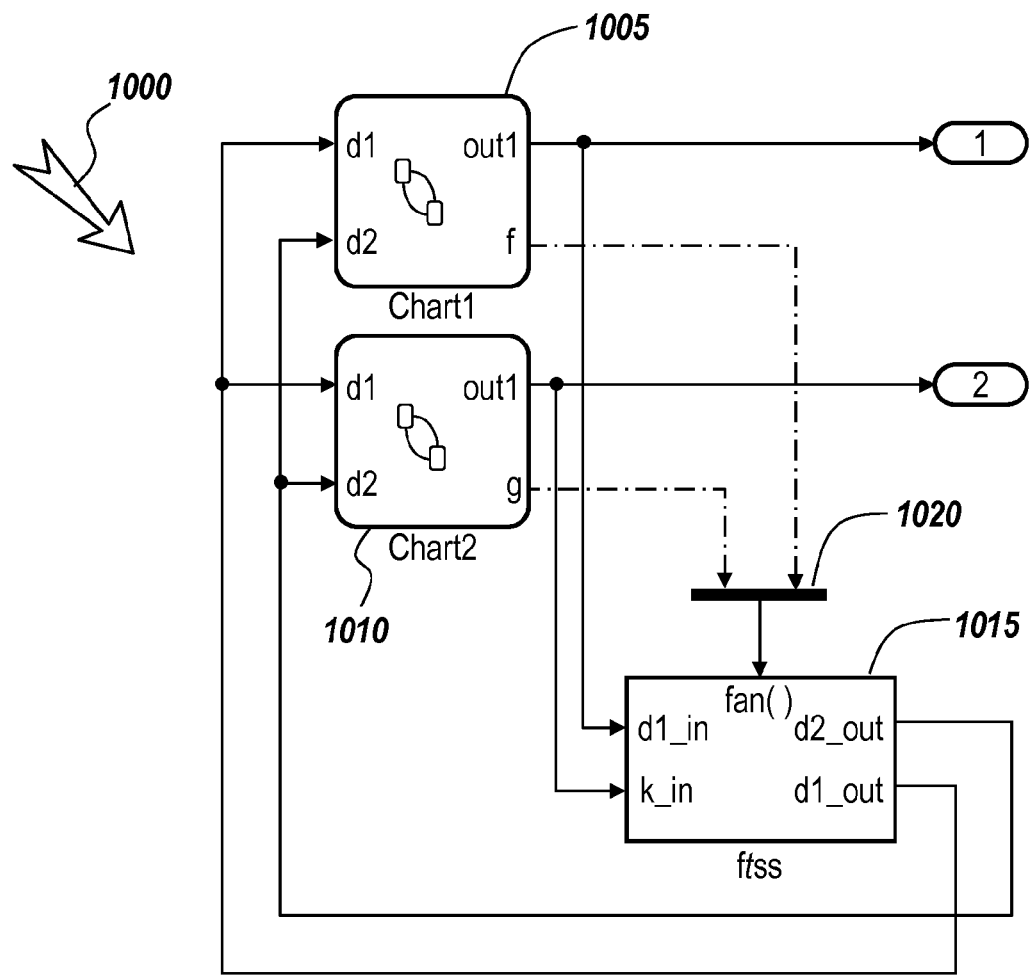
FIG. 10—illustrates a graphical model that employs a conventional technique for combining function-call control signals.

A conventional technique for joining control signals together that can produce unexpected results may be realized using Simulink 7.3 (R2009a). For example, Simulink 7.3 provides a Mux block as shown in FIG. 10. In FIG. 10 function-calls are combined into a wide function-call signal 1020 that includes signals f and g. The wide function call signal is used to invoke the Function-Call Subsystem 1015. The wide function-call signal 1020 enables either Chart1 1005 or Chart2 1010 to run the Function-Call Subsystem 1015.

A potential downside of the implementation of FIG. 10 is that the ordering of the control initiators (Chart1 1005 and Chart2 1010) is not clearly demarcated to a user. The semantics of Simulink 7.3 indicate that either Chart1 1005 or Chart2 1010 can be first in the sorted-list. The sorted-list of blocks is generated when analyzing the model by using data dependencies among the blocks. The sorted-list is then used to create block function execution lists that are used to run the model. Execution lists may also be referred to as block method execution lists because blocks are often implemented using object oriented programming techniques where the functions are methods of a class. Switching the ordering of Chart1 1005 and Chart2 1010 in the sorted-list will change the result, or answer when FCSS 1015 has blocks with state inside it. Since there are no data dependencies between Chart1 1005 and Chart2 1010, the order is inferred from block priorities when block priorities are specified; otherwise, the block names are used. Thus, seemingly insignificant changes to a block (e.g., a new block name) can produce significant changes in a result, or answer, produced by a model.

An exemplary embodiment of the invention can overcome limitations, such as those associated with the Simulink 7.3 embodiment of FIG. 10. For example, an embodiment of the invention can use a control signal join block to predictably provide multiple control initiators to a subgraph. An alternative name for the Function-Call Join block would be a Function-Call Sequence block. For example, a Control Signal Join block is used when it is desirable to have multiple control initiators of a given subgraph (or single block). A Control Signal Join block specifies the ordering when two or more invocations of the Join block are initiated on the same time step.

Figure 11:
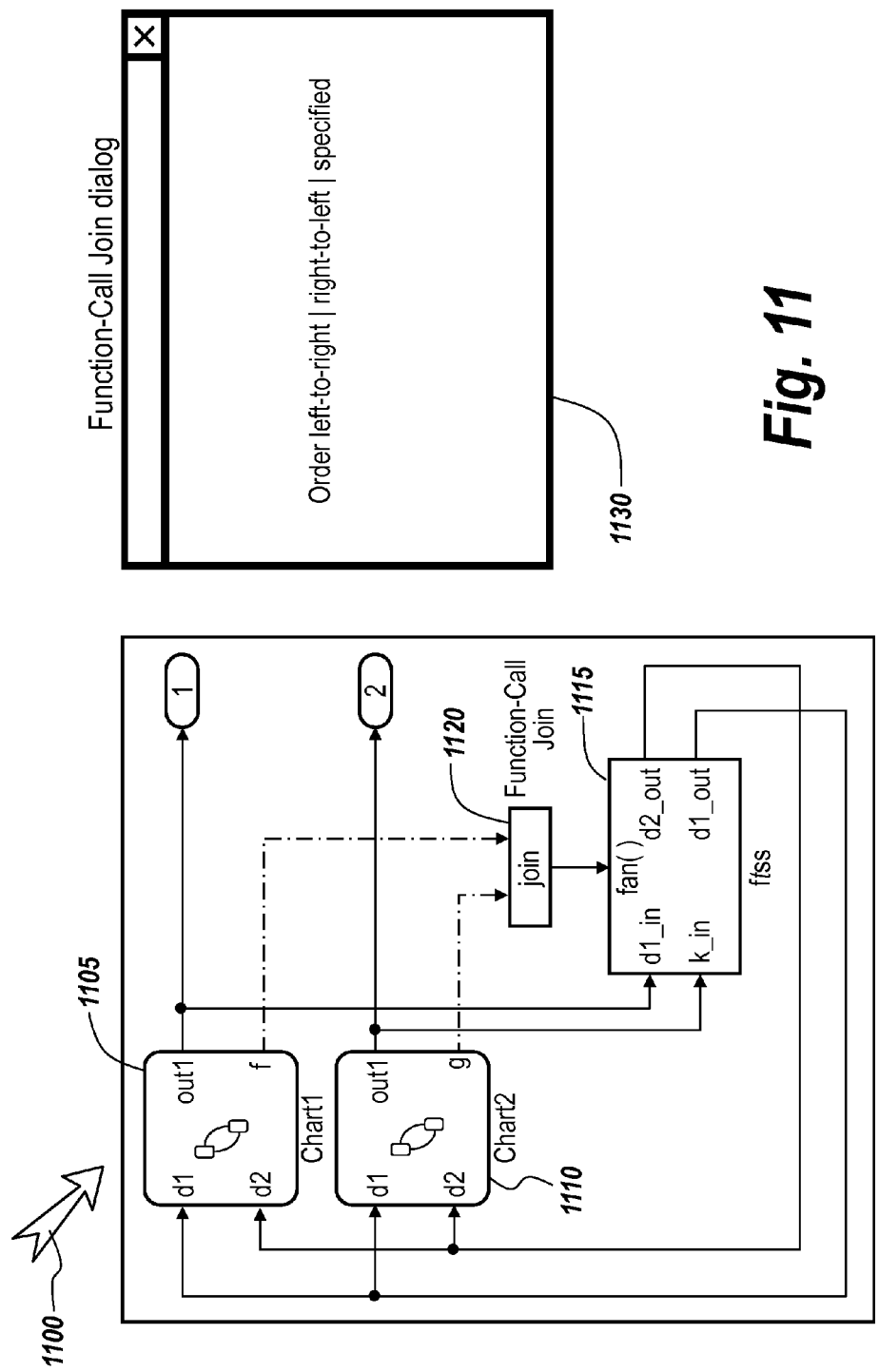
FIG. 11—illustrates an embodiment that includes a Function-Call Join block to predictably provide multiple control initiators to a subgraph.

For example, and referring to FIG. 11, the Function-Call Join block 1120 can include a dialog window 1130 that can be used to display information regarding operation of join block 1120. For example, dialog window 1130 can display information indicating that join block 1120 uses an ordering that is either left-to-right, right-to-left, or specified. When specified is selected in dialog window 1130, a set of indices corresponding to the input ports are provided giving the desired ordering. In the embodiment illustrated in FIG. 11, left-to-right ordering has been selected.

Referring to FIG. 11, a left-to-right ordering means that Chart2 1110 must be placed before Chart1 1105 in the sorted list. The sorted list may be a data structure that is used by a simulation or code generation engine to generate execution lists. This ensures that on any given time step, if both Chart1 1105 and Chart2 1110 are invoking subgraph 1115, then Chart2 1110 will come first. Within the Function-Call Subsystem, FCSS, 1115, the user can add logic that makes decisions based on which specific initiator invoked the function-call subsystem. For example, if Chard, 1105 invoked FCSS, 1115 then one action could be taken otherwise if Chart2, 1110 invoked FCSS 1115, then another action could be taken.

Figure 12:
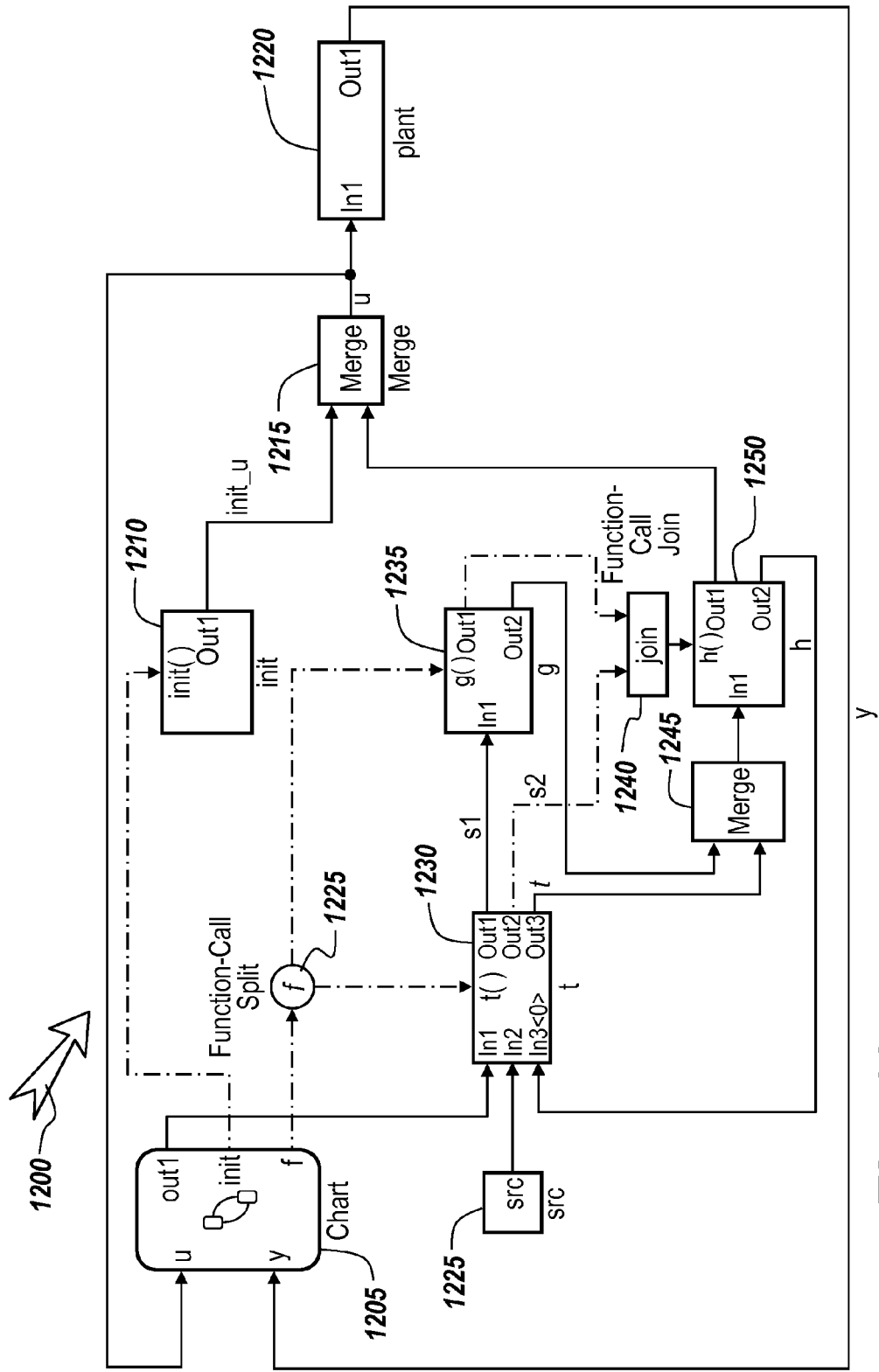
FIG. 12—illustrates an embodiment that includes a Function-Call Split block that creates a subgraph which honors data dependencies and within the subgraph a Function-Call Join block is used to predictably provide multiple control initiators to a subgraph.

The Function-Call Join block 1120 is useful for handling a subgraph created by a Function-Call Split block. In FIG. 12, model 1200 includes a chart 1205 that initiates execution of the subgraph defined by the Function-Call Split block 1225, Function-Call Subsystems, f 1230, g 1235, h 1250, Merge block 1245, and the Function-Call Join block 1240. Within the subgraph, both Function-Call Subsystems f 1230 and g 1235 use the Function-Call Subsystem h 1250. Both f 1230 and g 1235 provide an input, In1 to Function-Call Subsystem h 1250 via a Merge block 1245. The Function-Call subsystem f 1230 uses the result of calling h 1250 during its processing and the Function-Call Subsystem g 1235 invokes h 1250 to produce the final answer of the subgraph which is provided to the plant 1220 via the Merge block 1215. As before, the chart 1205 can choose to either run the init (initialization) Function-Call Subsystem 1210, typically at system startup, or run the subgraph by invoking a function-call on f 1230.

The Function-Call Join block (or generally a Control Signal Join) block output is either connected to a subgraph being explicitly controlled as in FIG. 11 or it can be connected to another Join block. The cascading of join blocks in effect produces a network of join blocks that result in one join operation.

Figure 13:
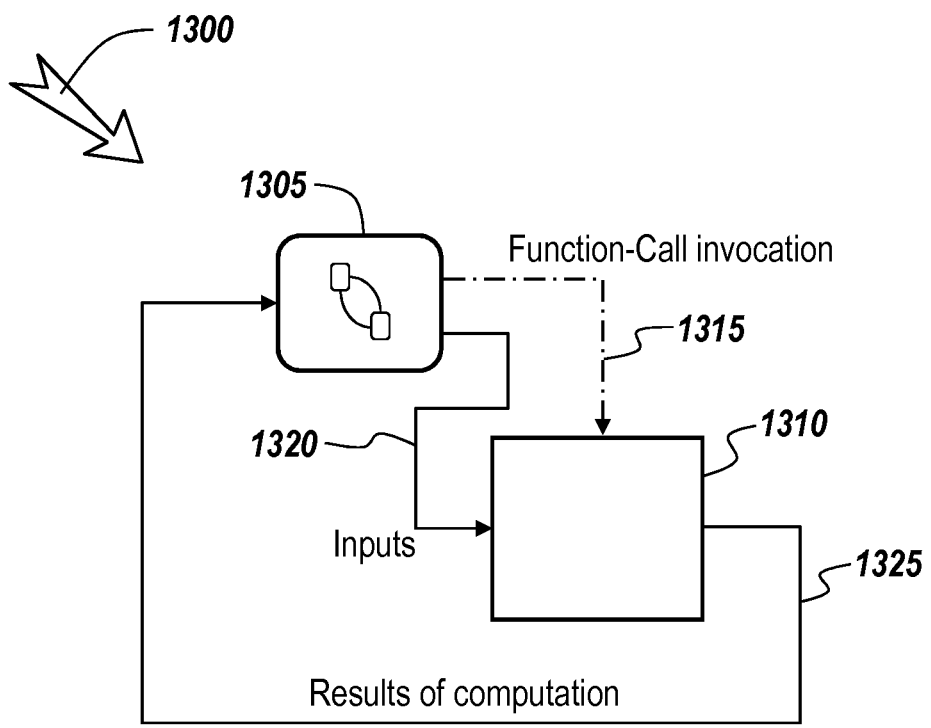
FIG. 13—illustrates a conventional technique that uses external function invocations.

Conventional techniques may infer function-call signatures from a graphical diagram. FIG. 13 illustrates a conventional technique using Simulink 7.3 external function invocations.

In FIG. 13, chart 1305 invokes the function-call subsystem 1310 with Inputs 1320 and receives the results of the computation via result signal 1325 for immediate use during the time-step. The construct illustrated in FIG. 13, when used with many input signals and result signals, produces a diagram that is difficult for users to understand and/or follow. Furthermore, the analysis of the model 1300 requires that all blocks be available to a compiler used to execute the model. This prevents a user from componentizing (or partitioning) the model into two independent parts, one consisting of the Chart 1305 and the other consisting of the Function-Call Subsystem, 1310.

Figure 14:
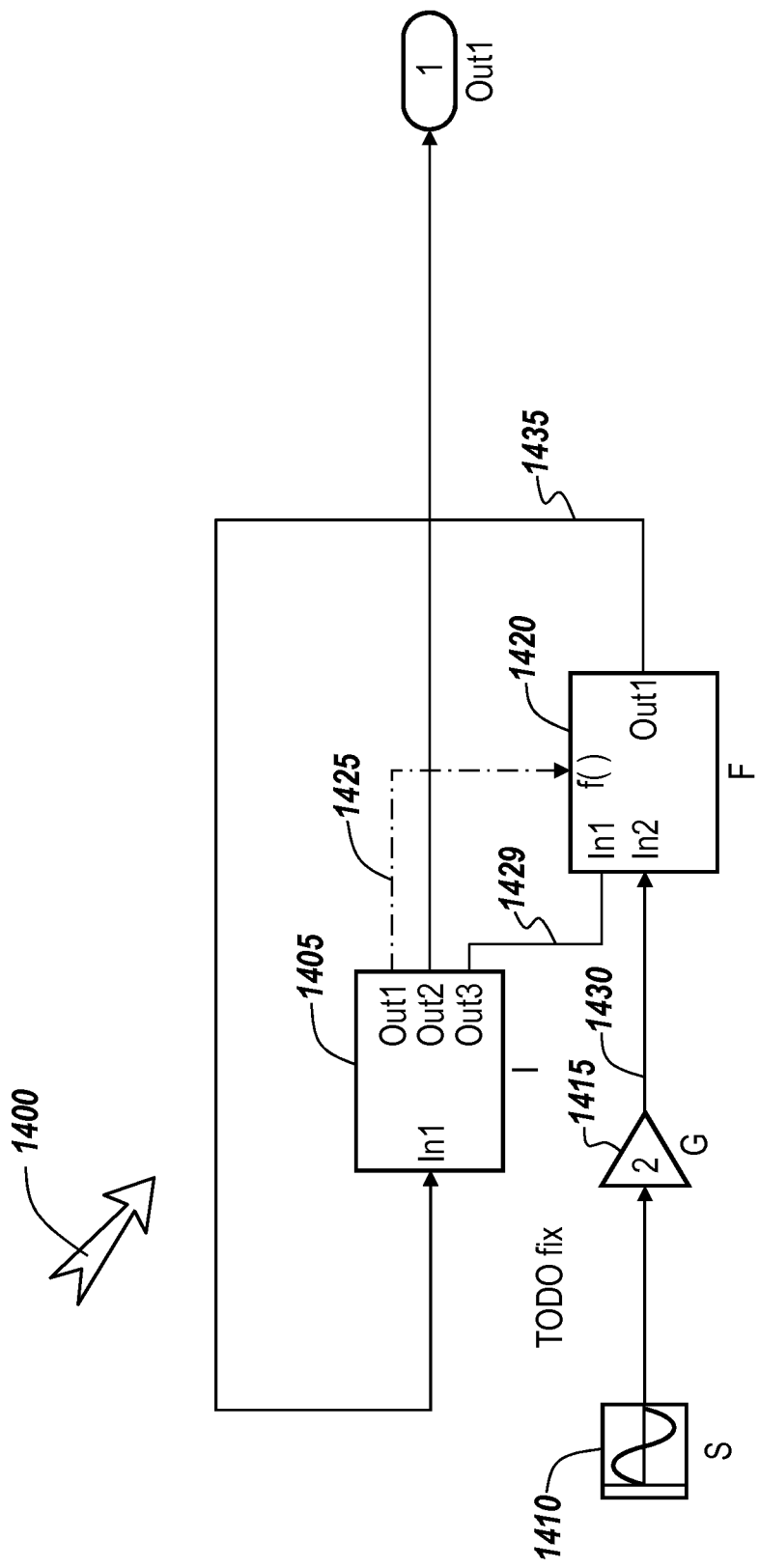
FIG. 14—illustrates a conventional technique that uses external function invocations with an implicit input to a function-call subsystem.

Referring to FIG. 14, consisting of a conventional technique for external function invocations, the function-call subsystem f 1420 has two inputs—one from the initiator function-call subsystem, 11405 and the other from the Gain block, G 1415. The function-call itself, therefore, has two inputs, namely signal 1429 and signal 1430. Similarly, the function-call has one return value (result of computation) from f 1420 back to the Initiator 1405 via signal 1435. The implications of this signature are two fold:
1. During simulation, before the invocation of the function-call subsystem f 1420 by the initiator 11405 both inputs need to be ready. This implies that G 1415 needs to execute prior to 11405
2. When code is automatically generated from the model, the function generated for f 1420 will have two inputs and one return value.

In FIG. 14, the signature of the function-call is implied by the connectivity of model 1400 and is derived during the compilation process. For example, this process is used in Simulink 7.3 and earlier versions of Simulink.

Figure 15:
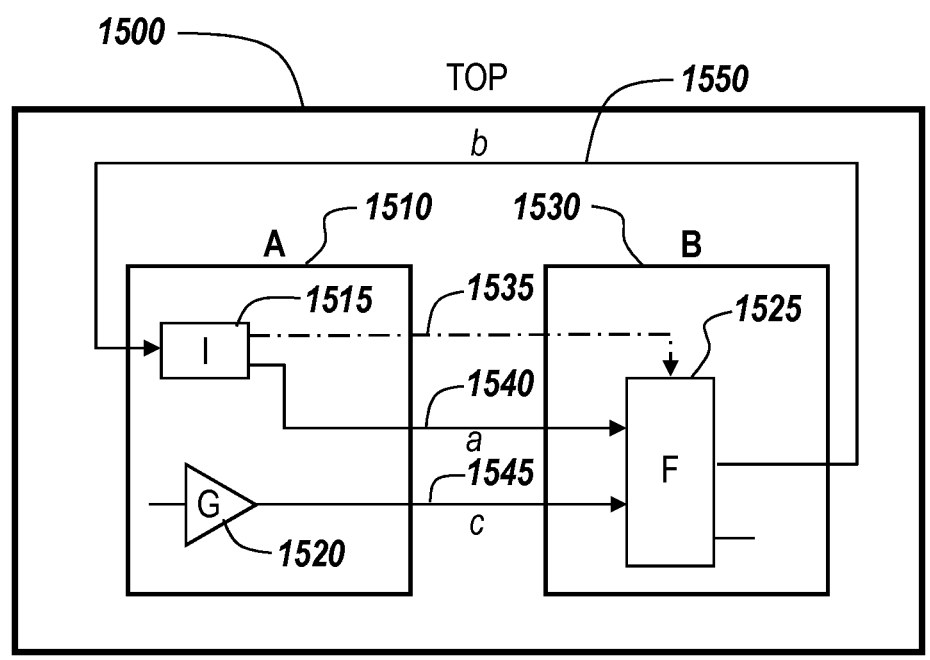
FIG. 15—illustrates a conventional technique that uses external function invocations across subsystem boundaries.

Approaches to extracting the signature of the function-call, such as is shown in FIG. 14, does not scale to complex systems where different components of a system may be modeled with only knowledge of the interfaces of systems they interact with. By way of example, consider FIG. 15 illustrating a conventional technique using external function invocations that includes model 1500, identified as TOP and subsystems A 1510 and B 1530 which we'd like to make components Model 1500 uses (references) two separate subsystems, namely subsystem A 1510 and subsystem B 1530. We'd like to make A 1510 and B 1530 components that can be independently analyzed (compiled for execution). In Simulink 7.3, components may be referred to as Model Reference blocks. In general componentization lets a user define re-usable model components that can be compiled independently of their use. For example, if 1510 and 1530 were a components (Model Reference blocks), 1510 may be compiled independent of 1530. However, in conventional environments components cannot be created that have control signals such as the function-call signal 1535 cross system boundaries. In some embodiments, a component may represent a model.

By way of example, FIG. 15 may illustrate an embodiment configured to depict three separate component models, one for the TOP, one for the A 1510, and one for B 1530. If this were the case, then it would possible to independently open and execute A 1510 or to use model A 1510 from another model. Therefore, when constructing model A 1510, it should be possible to build model A 1510 without knowing the contents of model B 1530 or how TOP (model 1500) might be using model A 1510. This workflow may imply two things:
  1. The builder of model A 1510 needs to be able to capture information regarding signals marked a 1540, b 1550, and c 1545 in model A 1510 because signals a 1540, b 1550, and c 1545 all constitute the signature of the function-call invoked in model B 1530.
  2. The builder of model B 1530 needs to be able build the function-call subsystem without knowing the contents of model A 1510.

To satisfy 1 and 2 above, builders of models A 1510 and B 1530 each need a mechanism (or a contract) for capturing the signature of the function-call the two models share.

Figure 16:
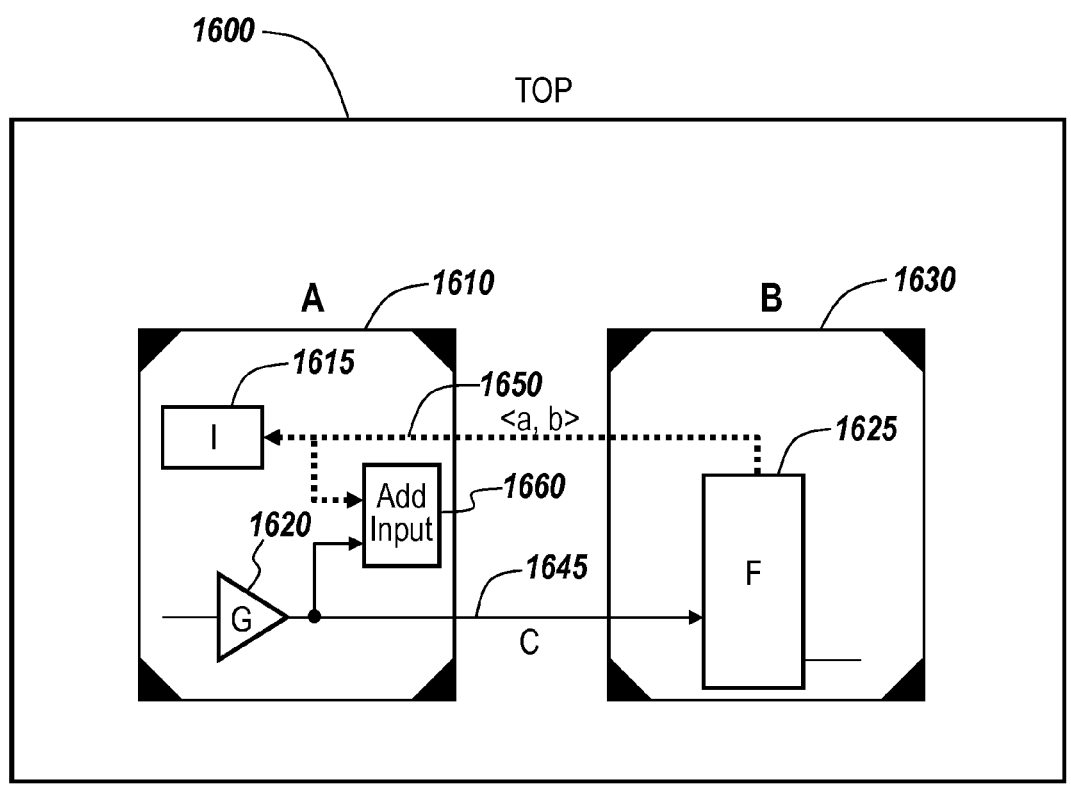
FIG. 16—illustrates an exemplary embodiment of the invention that provides the ability to create components with control signal (e.g. function-call or action signal) inputs and outputs of the components.

FIG. 16 illustrates an exemplary embodiment of the invention that provides the ability to create components with control signal (e.g. function-call or action signal) inputs and outputs of the components. FIG. 16 produces the same answer as FIG. 15. However, a difference between FIG. 15 and FIG. 16 are that FIG. 16 has componentized the subsystem A 1510 into Model Reference component A 1610 as indicated by the solid triangles in the corners of the model block. Similarly, FIG. 16 has componentized the subsystem B 1530 into Model Reference component B 1630.
  1. In model A 1610, the builder will have the ability to produce a single signal 1650 that includes the invocation signal of the function call, the input arguments from the initiator of the function-call and the return values (results of processing) of the function-call. This is referred to in general as subgraph control signals with input and output arguments, further illustrate in FIG. 16. In contrast, conventional techniques express each function call as a separate signal.
  2. In model B 1630, the builder will have the ability to capture the input arguments and return values expected from the initiator in a structured form. One structured form could be a table which corresponds to a Subgraph Control Signal Class from which objects describing the signature are created, further illustrated in FIG. 16.
  3. In model A 1610, the builder will have to ability to capture the fact that gain G 1620 is an implicit input to the function-call invoked from A 1610. One way of capturing this information graphically is shown in the Subgraph Control Signals with Input and Output arguments illustrated in FIG. 16 via the Add Input 1660 Marshal block.

The exemplary mechanisms listed above facilitate the following:

1. Models A 1610 and model B 1630 can be compiled in isolation and a user can generate code for one model without the presence of the other.
2. The execution order of blocks in model A 1610 can be determined without the presence of Model B 1630.
3. When Model A 1610 and model B 1630 are connected together, a user can easily check that the contract for the function-call is met by both model A 1610 and model B 1630 because the signatures of the function-calls are specified at both models.
4. The builders of model A 1610 and model B 1630 can build their models in a modular fashion.

Figure 17:
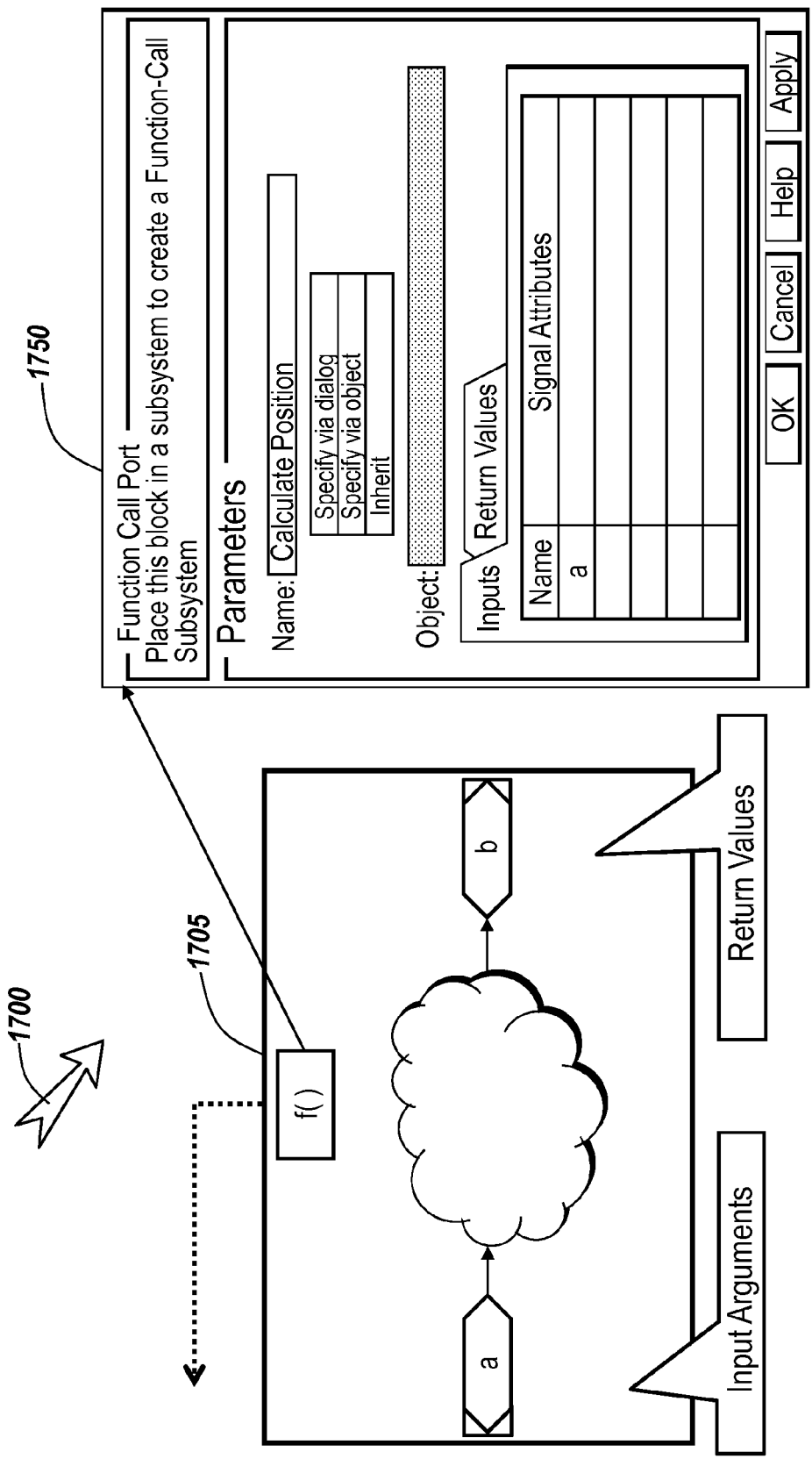
FIG. 17—illustrates an exemplary technique for allowing a user to create and/or edit the signatures of a function-call subsystem signals.

FIG. 17 illustrates an exemplary technique for allowing a user to create and/or edit the signatures of a function-call subsystem signal such as 1650. For example, a function-call subsystem 1705 may be associated with a dialog window 1750 that allows a user to input information associated with function-call subsystem 1705 which represents the input value a and output value b of the function-call subsystem 1625 of FIG. 16.

Exemplary embodiments can use Control Signal Group and Control Signal Ungroup blocks to allow models to be decomposed into separate units that can be independently compiled and/or reused. For example, a model may include control signals that cross boundaries of subsystems in the model. The model may use control signal group blocks or control signal ungroup blocks along with input and/or output data signals to provide independent control to respective subsystems in the model. The use of control signal group and/or ungroup blocks may allow the subsystems to be independently compiled and reused. The use of control signal group and ungroup blocks can provide models with the capability to have control signals cross hierarchical boundaries of the model, enable parallel compilation of components (e.g., subsystems) in the model, allow for independent verification of components of the model and provide uses with improved development workflows (e.g., when many people are working on a model).

Figure 18:
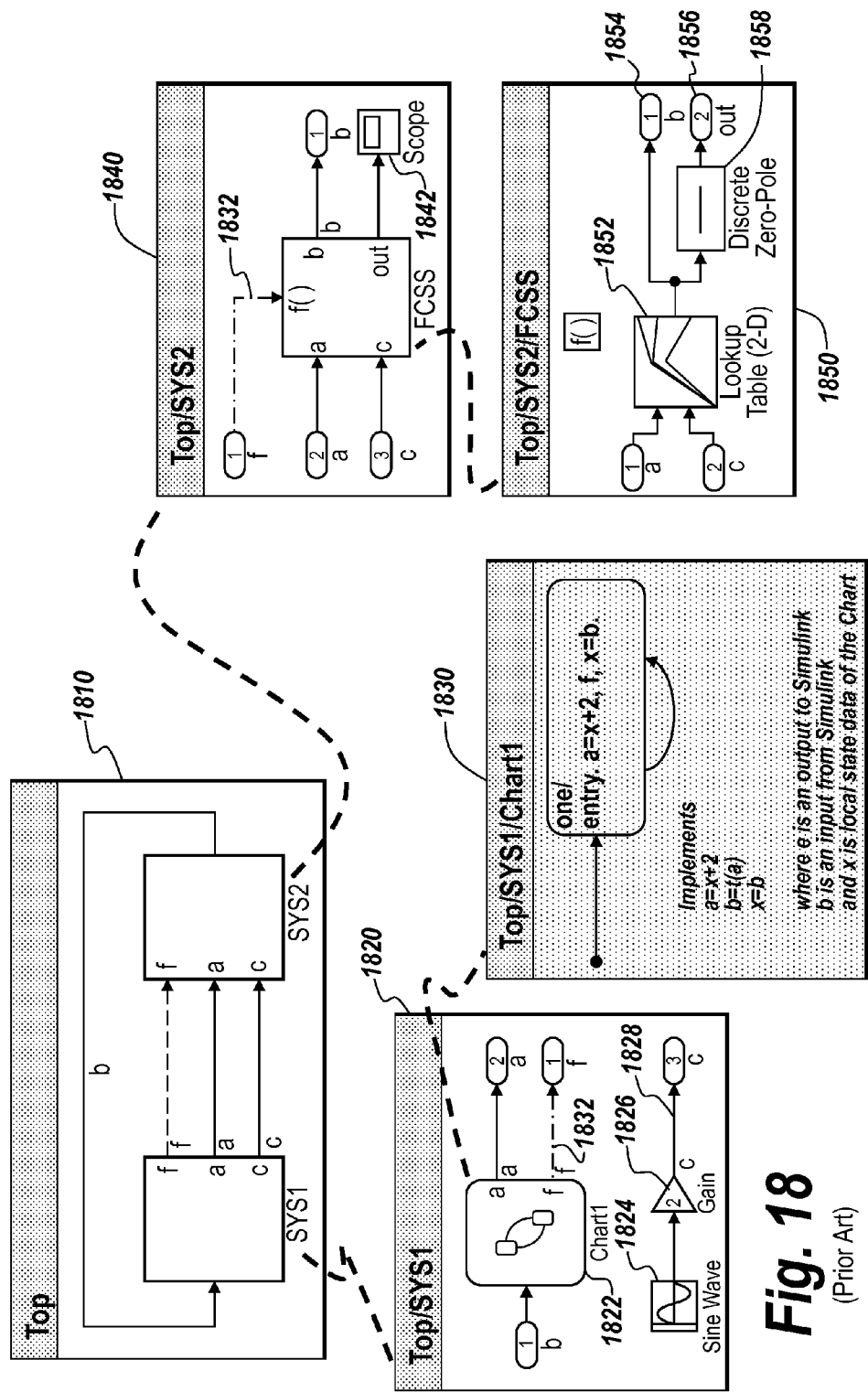
FIG. 18—illustrates a conventional model that uses conventional implementations of function call subsystems.

FIG. 18 illustrates a conventional model that uses function call subsystems. In FIG. 18, model 1810, named Top, consists of two subsystems, SYS1 1820 and SYS2 1840. SYS1 1820 contains a state chart, Chart1 1822, that invokes a Function-Call Subsystem, FCSS 1850 in SYS2 1840 via the function-call control signal, f 1832. SYS1 1820 also contains a Sine Wave block 1824 and a Gain block 1826. Because the output signal, c 1828, of the Gain block 1826 is an input to the Function-Call Subsystem, FCSS 1850, the gain must be computed before Chart1 1830 is executed because Chart1 is responsible for executing FCSS 1850 and FCSS has a data dependency on c 1828, which is computed by the Gain block, 1826 using the sine wave value 1824. Thus, to sort SYS1 1820, we need to know the contents of SYS2 1840 and how SYS2 1840 is using the signal, c 1828. Had SYS2 1840 used the signal c 1828 (its $3^{rd}$ input) elsewhere and not by the FCSS 1850, then Sine Wave 1824 and Gain 1826 could be executed before or after Chart1 1830 because there is no execution (data) dependency in this case.

However, in FIG. 18, an execution dependency requires that the Sine Wave 1824 and Gain 1826 execute before Chart1 1830 is executes. The contents of the Chart1 1830 consist of a single state that produces 'a' which is set to x+2, where x is an internal state of Chart1 1830 and is initialized to 0 by the chart. After computing a, Chart1 1830 continues execute the Function Call Subsystem, FCSS 1850, by invoking it via the Function-Call control signal, f via the f statement. FCSS 1850 then transforms the signal a (which will be 2 on the first time step), via the Lookup Table (2-D) 1852 and provides this transformed signal to the $1^{st}$ Outport block 1854 labeled b. FCSS 1850 then transforms this signal (b) again using the Discrete Zero-Pole block 1858 and provides this signal to the $2^{nd}$ Outport block 1856 labeled out.

After FCSS 1850 finishes executing, execution control is returned to Chart1 1830 where the transformed signal, b, is saved by Chart1 1830 in its internal state, x via the x=b statement. The direct feed-though bit on b was cleared because it is a return value from the invoked Function-Call subsystem, FCSS 1850. Therefore, to generate the correct sorted list and block method execution order, the contents of SYS2 1850 are also needed to determine which signal are return values. After SYS1 1820 finishes executing, SYS2 1840 executes. Since FCSS 1850 is not directly executed by SYS2 1840 (its execution initiator is Chart1 1830 which already ran), the only other blocks in SYS2 1840 which need to be evaluated is the Scope block 1842 which plots the value of out computed by Chart1 1830 via the FCSS 1850 invocation. This completes the execution of the first time step for the model 1810. This process continues with time advancing until the desired stop time is reached.

Figure 19A:
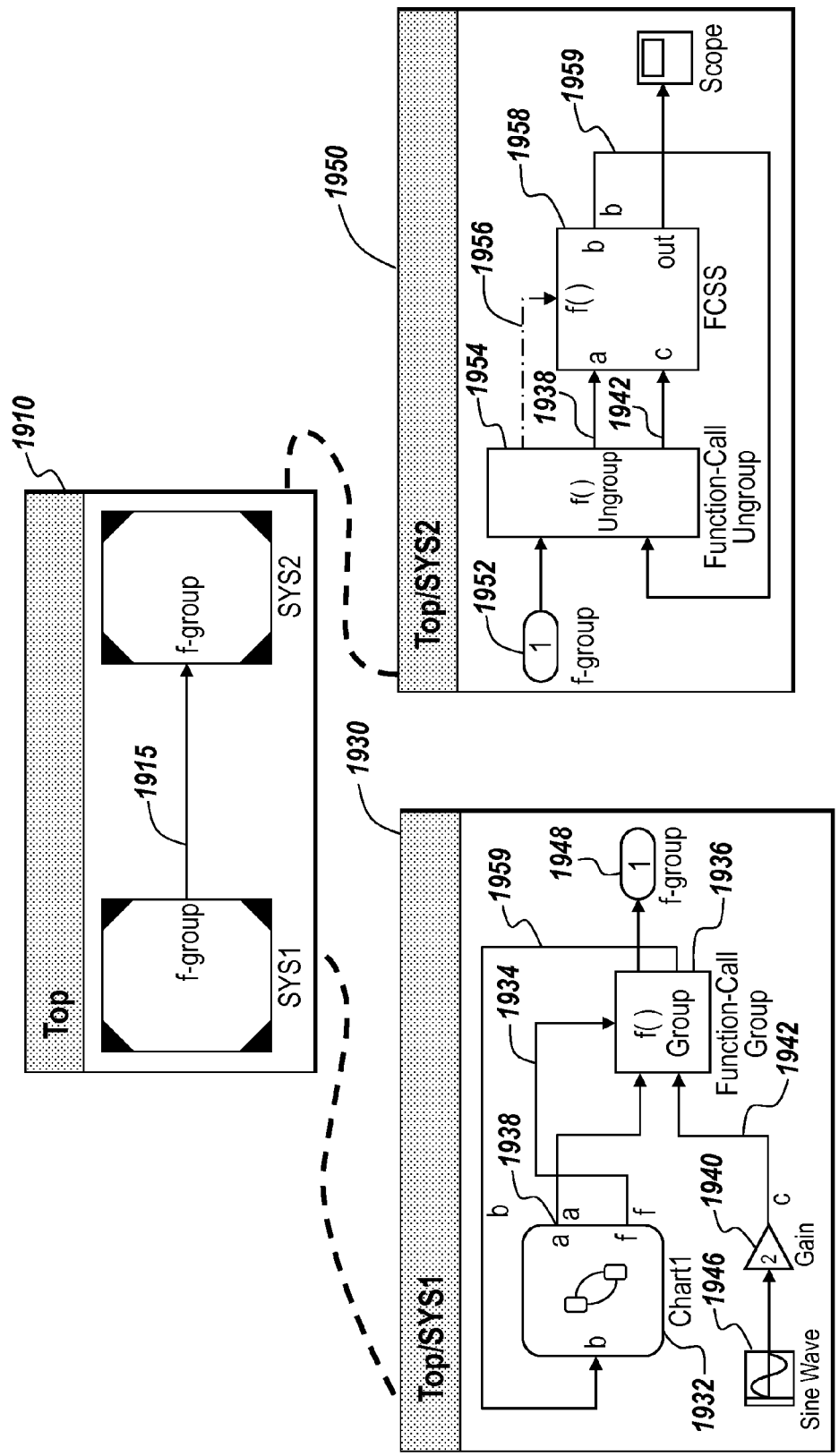
FIG. 19A—illustrates an embodiment that uses function-call group and ungroup blocks to enable componentization of systems with a control signal crossing the systems boundaries.

FIG. 19A illustrates an embodiment that uses function-call group and ungroup blocks to enable componentization of systems with a control signal crossing the systems boundaries. In FIG. 19A, the system of FIG. 18 is implemented in an embodiment of the invention that uses function-call group blocks and function-call ungroup blocks. The implementation of FIG. 19A employs a technique referred to as componentization (e.g., model referencing) to simplify representing the system to a user. For example, and referring to FIG. 19A, model TOP 1902 can include two subsystem. For example, one subsystem can be represented as SYS1 1904 using a Model Reference block that can be compiled and/or analyzed without knowledge of the contents of SYS2 1930, another Model Reference block, and vice versa. For example, if a user were to right-click on the f-group signal 1922 or 1932 or the signal 1915 connecting SYS1 to SYS2, the user could inspect the contents of the signal and the contents would show that the signal is a bundled signal consisting of a function-call control signal originating at 1906 and terminating at 1940 with data input signals a 1910 and c 1916 and return value signal b, 1944. This inspection could be shown either textually or graphically in a dialog.

SYS1 1904 includes Chart/1908, which is implemented using logic similar to that of the Chart1 1830 in FIG. 18. The Function-Call control signal, f 1906 is provided for a Function-Call Group block 1918 along with the Function-Call input data signal, a 1910. The output of the Gain block 1914, c 1916, is also provided to the Function-Call Group block 1918. The Function-Call Group block 1918 can be configured to specify the return values and signal attributes (data type, dimensions, sampling modes, etc.) such as their data type as show in FIG. 20A.

Figure 20A:
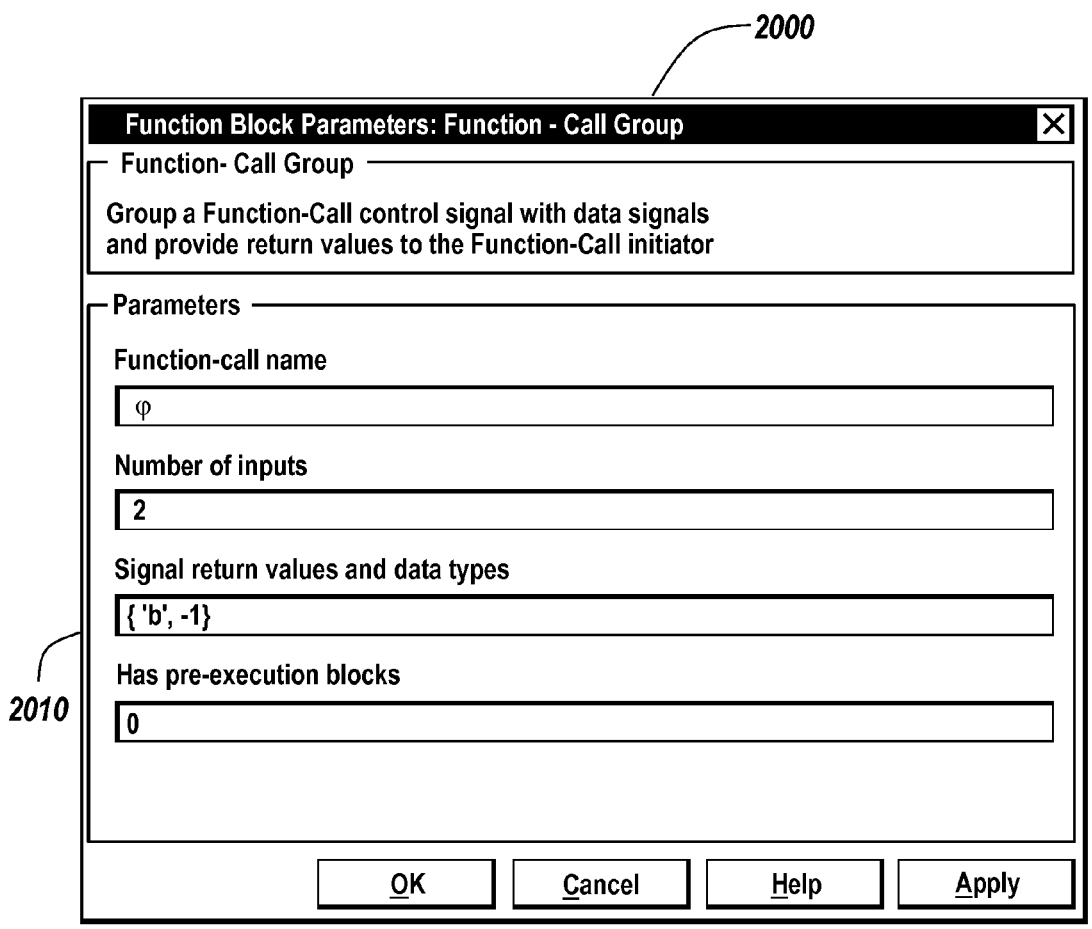
FIG. 20A—illustrates an embodiment of a Function-Call Group block dialog.

Referring now to FIG. 20A, dialog 2000 may include one or more fields 2010 in which a user can specify signal values, signal attributes for the signals, etc. In an embodiment, dialog 2000 may allow users to specify signal values and signal attributes using MATLAB cell syntax. For example, the $i^{th}$ element of a cell array and the data type for the respective return value signal is the $i+1^{th}$ element. In FIG. 20A, a user may have specified that the data type is inherited, meaning that the signal attributes will be back inherited from the Chart1 input. Alternatively, the properties of the Function-Call Proxy and Function-Call Proxy Adaptors could be specified textually using an object-oriented syntax such as MATLAB's Class system.

Referring now to FIG. 19A, at SYS1 1904 in isolation (without knowledge of the contents of SYS2 1930) the model of SYS1 can be analyzed to identify all information about the function-call f 1906, initiated by the Chart1 1908 to enable independent compilation. It may be known that the output signal, a 1910, from the Chart1 1908 is a function-call input. In addition, it may be known that data signal c 1916, produced by the Gain block 1914, is an implicit input to the same function-call. Moreover, it may be known that input b 1920 to the Chart1 1908 is a return value data signal from the same function-call. This information ensures the compilation process of SYS1 1904 will place the Sine Wave block 1912 and Gain block 1914 before Chart1 1908. The compilation process will also clear the direct feed through of the input port, b, of the Chart1 1908 because b is a function-call return value. The bundled signal created by the Function-Call group 1918 is passed to the $1^{st}$ Outport block 1922, named f-group.

In Top/SYS2 1930 the first input port 1932 is connected to a Function-Call Ungroup block 1934. Block 1934 unbundles the f-group signal and produces function-call control signal 1940 used to invoke the Function-Call Subsystem, FCSS 1942. Block 1934 also unbundles the signals a 1938 and c 1942, which are also provided to FCSS 1942. Block 1934 may be associated with a dialog to allow users to enter information associated with block 1934. For example, a dialog for block 1934 may be similar to dialog 2000 that is associated Function-Call Group block 1918. A dialog window for block 1942 may allow a user to define that there is one return value from the Function-Call Subsystem, FCSS 1942, labeled, b 1944. Based on this information, we can compile SYS2 1930 can be coupled without knowledge of any other parts of the model.

The embodiment of FIG. 19A makes use of explicit signatures to ensure that users can compile components with control signal inputs and outputs without having knowledge of the control signal sources or destinations outside of the component being compiled. This enables componentization, parallel compilation, independent development and testing of the components. An additional capability provided by control signal inputs and outputs such as the function-call control signal input SYS1 and function-call control signal output of SYS2 is the ability to have multiple function-call inputs and outputs.

Figure 19B:
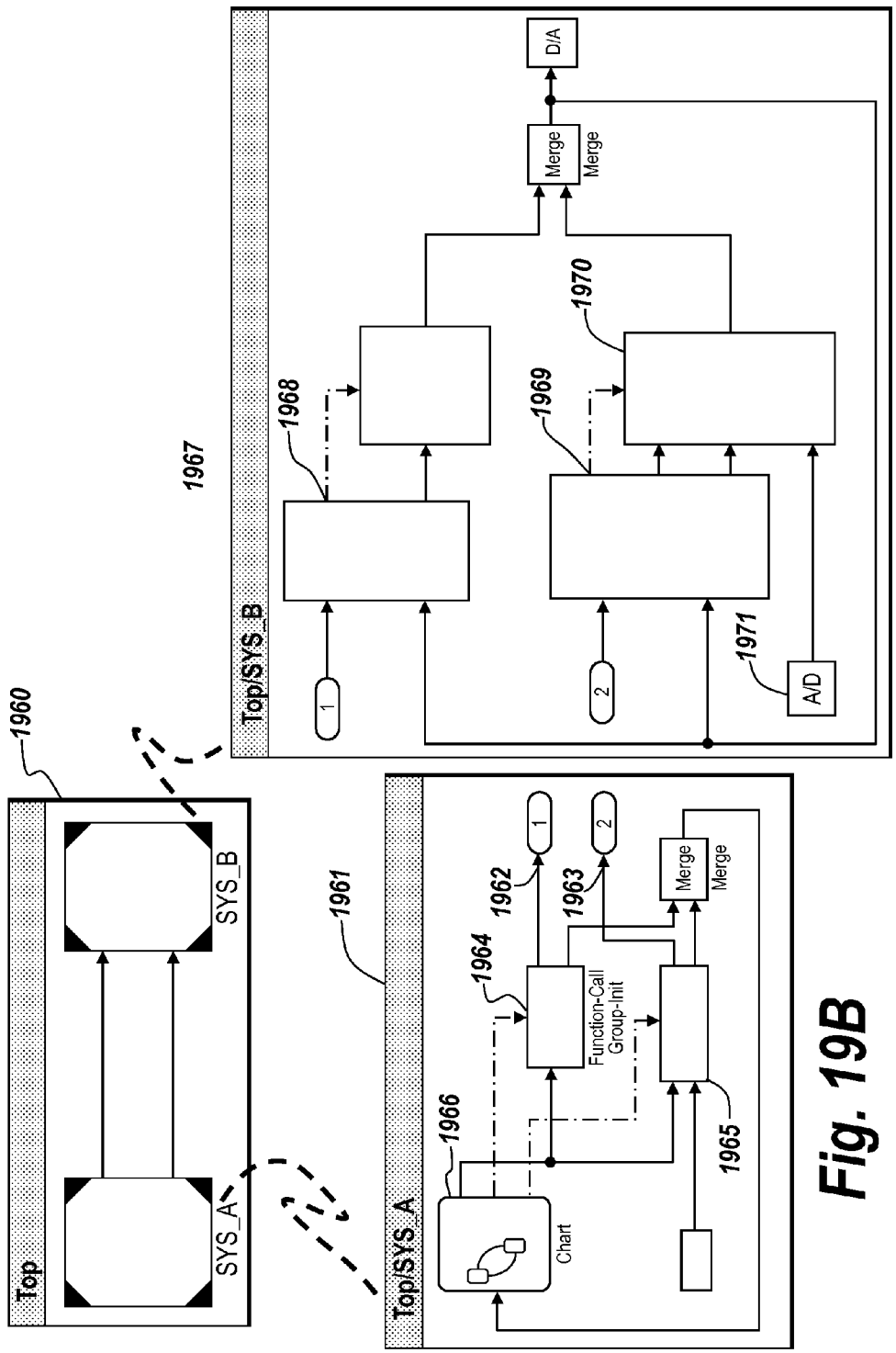
FIG. 19B—illustrates an embodiment that uses function-call group and ungroup blocks to enable componentization of systems with multiple control signals crossing the systems boundaries.

FIG. 19B, includes two componentized systems, SYS_A 1961 and SYS_B 1967 (Model Reference blocks in Simulink) used with model 1961. SYS_A 1961 is invoking two entry points on SYS_B 1967, the init entry point 1962 and the run1 entry point 1963 via function-call grouped signals output from function group blocks 1964 and 1965, respectively. SYS_A/chart 1954 initiates execution of either the init block 1964 or run1 block 1965 on any given time step. SYS_A 1961 illustrates the ability to have multiple function-call control signals from a chart and the ability to Merge (map to same memory location) the return values from the invoked function-call subsystems.

Figure 20B:
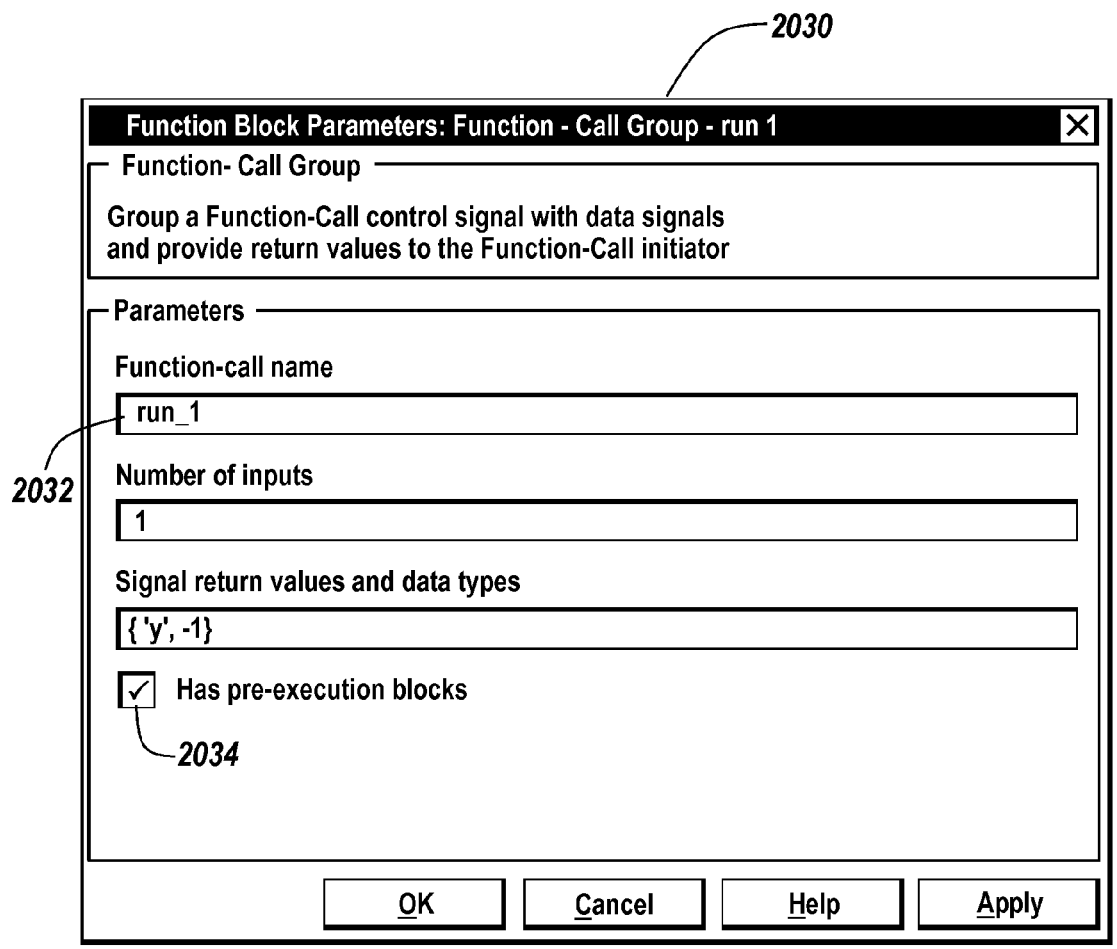
FIG. 20B—illustrates an embodiment of a Function-Call Group block dialog with 'Has pre-execution' blocks selected.

FIG. 20B illustrates a dialog window that can be used with, for example, Function-Call Group—run1 (block 1965). Dialog 2030 includes fields 2032 and a check box 2034 for 'Has pre-execution blocks'. When check box 2034 is selected, the selection indicates that before the run1 function-call can be invoked, some (unknown) set of blocks has to be executed before the control signal initiator (in this case 1966) because they are feeding the function-call subsystem being executed.

To ensure the pre-execution blocks run, SYS_A 1961 issues a run_1_pre_exeucte 'hidden' function-call (message) via the run1 f-group signal before running the Chart 1966.

Referring back to FIG. 19B, Top/SYS_B 1967, includes function-call ungroup blocks 1968 and 1969 used to unbundle the function-call control signal and the data signals. The Function-Call Subsystem, run1 1970, has an A/D block 1971 feeding it. To ensure correct results from SYS_B 1967, A/D block 1971 needs to run before run1 1970 is run. To achieve this, SYS_B 1967 creates a 'hidden' function-call input that can conceptually be part of the run1 f-group but with name run1_pre_execute( ).

In the embodiment of FIG. 19B, any component providing a grouped function-call signal must run this entry point. When compiling the Top system 1960, the signatures of the signals between the components can be observed to detect mismatches. For example, if the Top/SYS_A/Function-Call Group—run1 block 1965 did not check the 'Has pre-execution blocks' checkbox, a signature match would have been detected during compilation of Top 1960 and an error would be produced.

The block names Function-Call Group and Function-Call Ungroup are used convey that the blocks bundle signals together and then unbundle the signals, respectively. An alternative naming scheme would be to use the terms Function-Call Proxy and Function-Call Proxy Adaptor as shown in FIG. 19C.

Figure 19C:
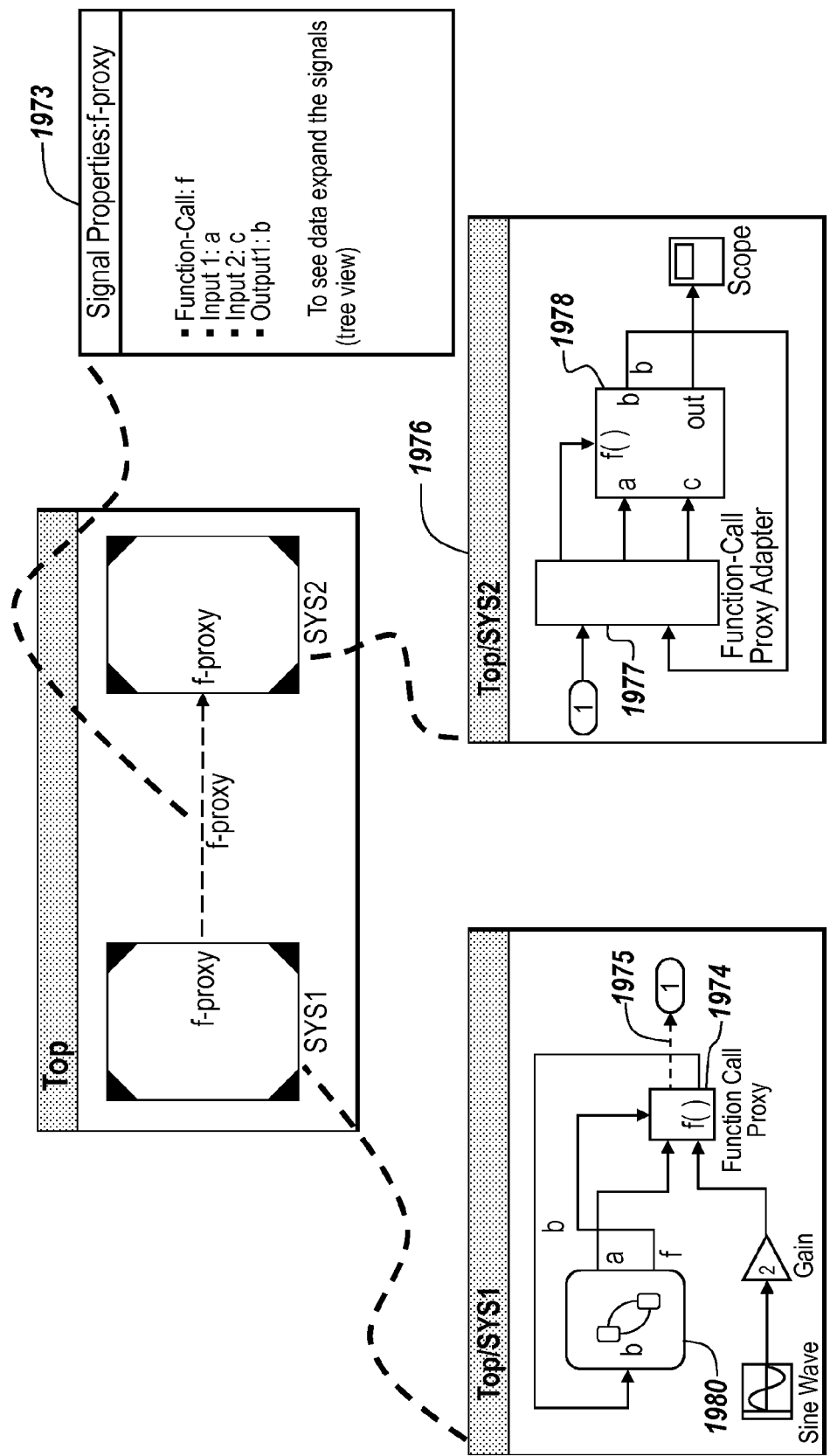
FIGS. 19C-19E—illustrate embodiments that further provide examples of componentization in graphical models consistent with principles of the invention.

FIG. 19C is similar to FIG. 19A, and includes renamed blocks. Generally, these blocks can be referred to as Control Signal Proxy and Control Signal Proxy Adaptor blocks. The basic functionality of these blocks may remain the same. For example, in FIG. 19C, the Function-Call Proxy block 1974 creates a bundled control signal labeled f-proxy 1975. The signal line is displayed using a contrasting line style to indicate the signal is a bundled control signal. If a user were to inspect the signal either textually or graphically using a dialog box, the user would see the bundled signal contains a function-call signal with a first input signal, a second implicit input signal c, and a return value signal, b. The dialogs of the Function-Call Proxy and Function-Call Unproxy block may be similar to FIG. 20A and FIG. 20B.

The Function-Call Proxy blocks and Function-Call Proxy Adaptor blocks need not have the same names in the signals. For example, in FIG. 19C, the signal inspection dialog 1973 shows that the f-proxy signal has elements named a, b, and c. Similarly TOP/SYS2 1976 is defined with signals a, b, and c. Alternatively, different signal names could have been specified in TOP/SYS2 1976 for the Function-Call Adaptor 1977 and/or the Function-Call Subsystem, FCSS 1978 as long as the signal attributes (data types, dimension, etc.) are consistent the model would be correctly defined and would execute.

It should be recognized that the Function-Call Proxy (or equivalently Function-Call Group) block is a form of Marshal block 1660 of FIG. 16. Both the Marshal and Function-Call Proxy block are used to create a bundled signal. Signal 1650 of FIG. 16 is a bundle that consists of a function-call signal, an input 'a' and a return value signal 'b'. signal f-proxy 1975 of FIG. 19C has a similar signature and they are effectively the same when Marshal block 1660 is used. The overall inputs the function-call subsystems, F 1630 of FIG. 16 and FCSS of FIG. 19C have the same signature (2 inputs, one output). If a user were to add a $2^{nd}$ input to the Marshal block 1660 of FIG. 16 the function-call subsystem 1625 of FIG. 16 would have 3 input arguments. Likewise if a user were to add a $3^{rd}$ input signal to the Function-Call Proxy block 1979, the function-call signal bundle, f-proxy would have 3 input arguments and the FCSS subsystem 1978 of FIG. 19C would have 3 inputs.

Similar flexibility and consistency is provided at the Function-Call Proxy Adaptor 1977.

Recognizing that the bundled signal 1650 of FIG. 16 may be preferred by certain users, the Chart1 1980 of FIG. 19C can be configured to produce a function-call control signal bundle containing a bundled signal. This is shown in FIG. 19D.

Figure 19D:
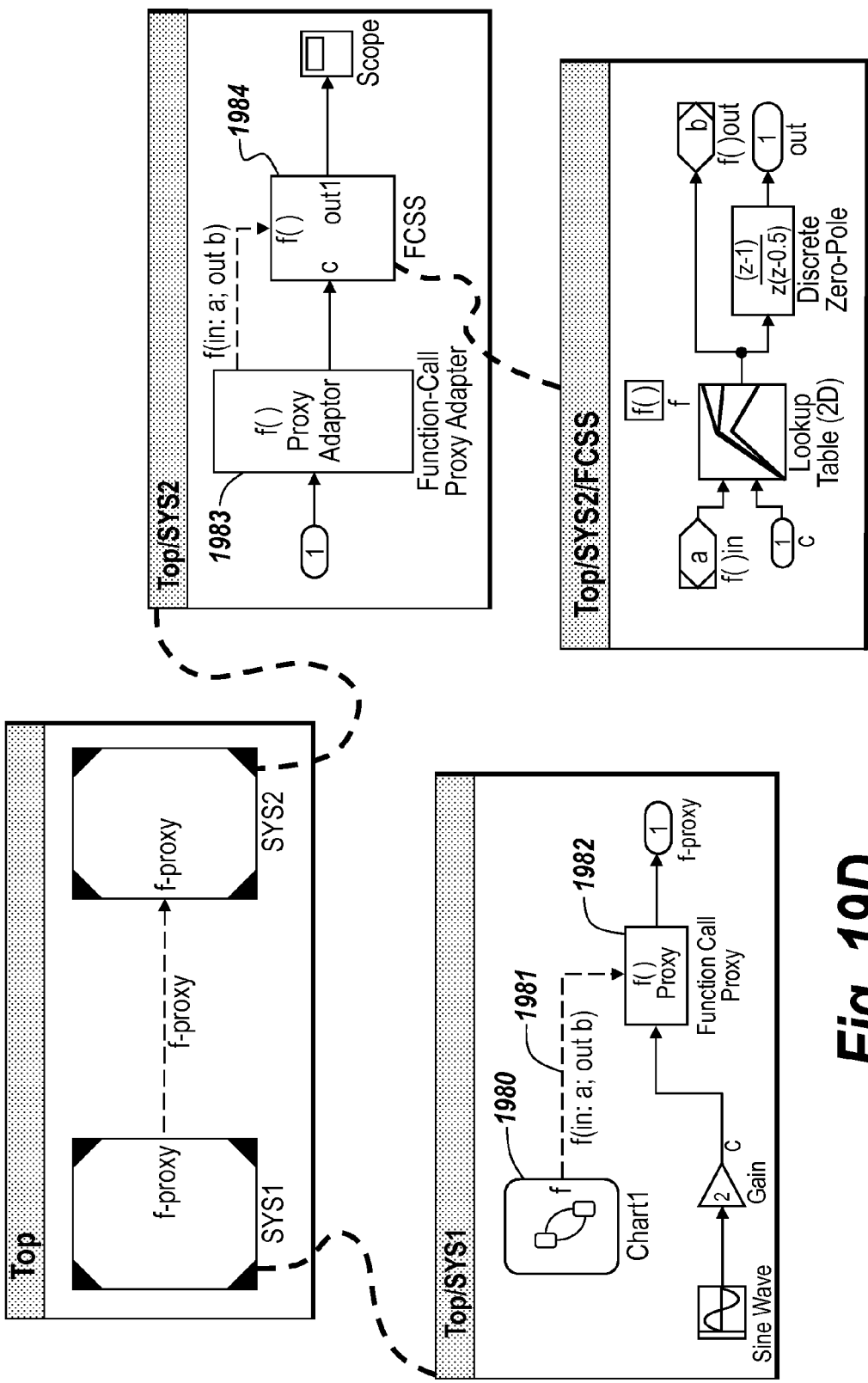

In FIG. 19D, Chart 1980 is making a function-call passing in the value a, and receiving the value b via signal 1981. From a functional perspective, the models of FIG. 19C and FIG. 19D are equivalent and produce the same answer. The Function-Call Proxy block 1982 is used to create the f-proxy bundled function-call control signal consisting of two inputs (a and c) and one return value (b). The Function-Call Proxy Adaptor 1983 is used to unbundle the f-proxy signal and provide the bundled functional-call control signal f(in: a, out: b) to the function-call subsystem, FCSS 1984.

One additional depiction of the Function-Call Proxy block 1982 would be to eliminate the explicit output port signal of the Function-Call Proxy block 1982 and in turn provide a paired function-call proxy port block that produces the function-call proxy signal at the top of the component. Additionally, the Function-Call Proxy Adaptor block 1983 could be depicted without the bundled function-call control signal and in turn have a paired function-call proxy adaptor port block that receives a bundled function-call control signal and implicitly provides it to the Function-Call Proxy Adaptor. This idea is illustrated in FIG. 19E.

Figure 19E:
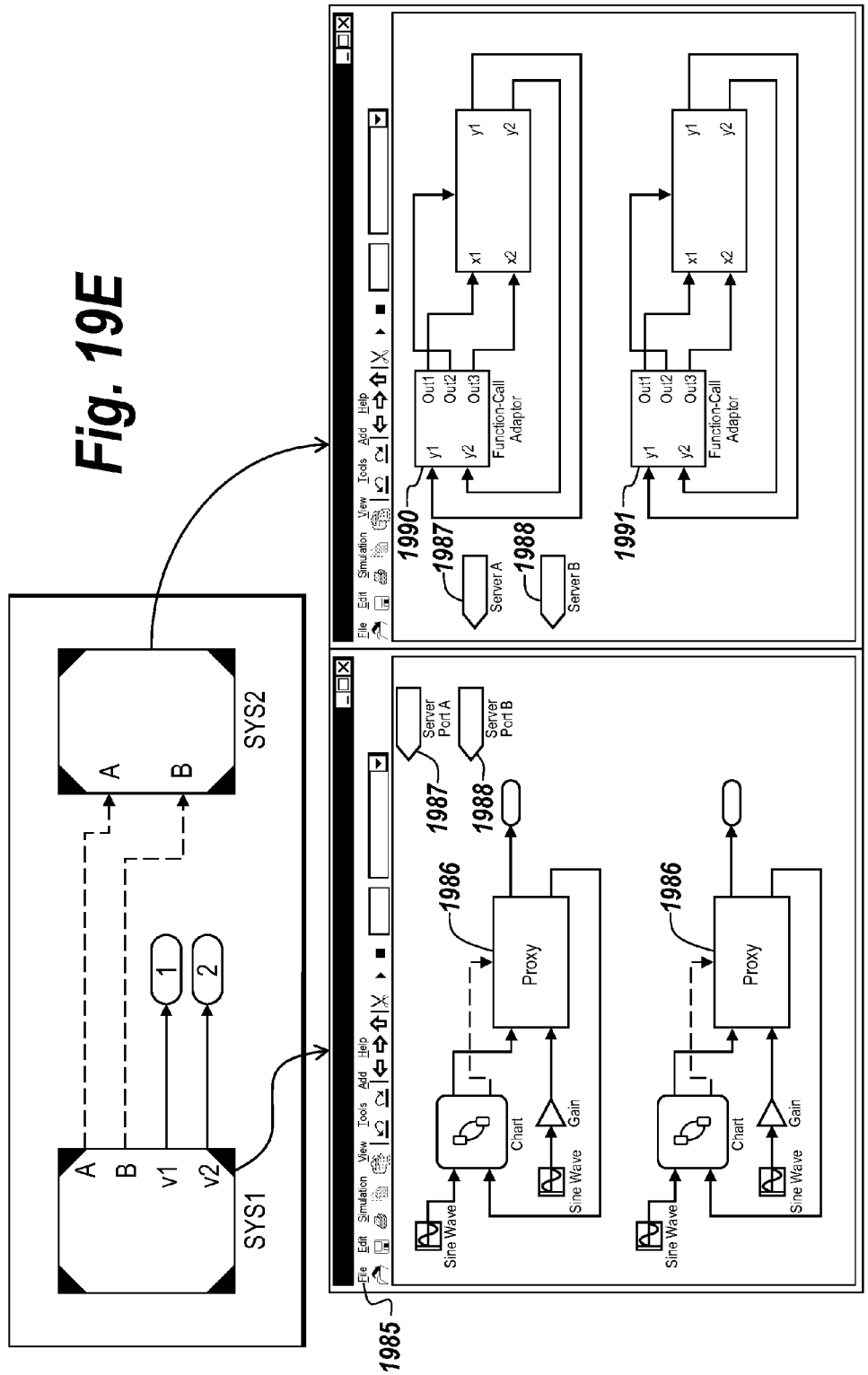

In FIG. 19E, the Proxy blocks inside SysA 1985 do not have an explicit output ports for the respective function-call groups. Instead, the Proxy block 1986 is directly "hyperlinked" to the Server port blocks A 1987 and B 1988. Similarly within SysB 1989, the Adapter blocks 1990, 1991 do not have explicit connections to the function-call group signals. Instead, they are hyperlinked to the Server blocks A 1987 and B 1988 inside SysB 1989. The respective Server Port blocks of SysA 1985 and SysB 1989 are connected to indicate that the function-call group signals of Sys5 A 198 are served by function-call blocks inside SysB 1989.

A Subgraph Split block can be setup to perform parallel execution of the subordinate blocks. For example, FIG. 21 illustrates a Function-Call Split block 2110 (a realization of the general concept of Subgraph Split block) has been configured to invoke its subordinate blocks, Function-Call Subsystem h1 2130 and Function-Call Subsystem h2 2140 in two new threads as annotated with the $f_p$ to in the icon to indicate parallel execution and the $Th_1$ 2150 and $Th_2$ 2160 function-call control signal labels (for thread 1 and thread 2).

Figure 21:
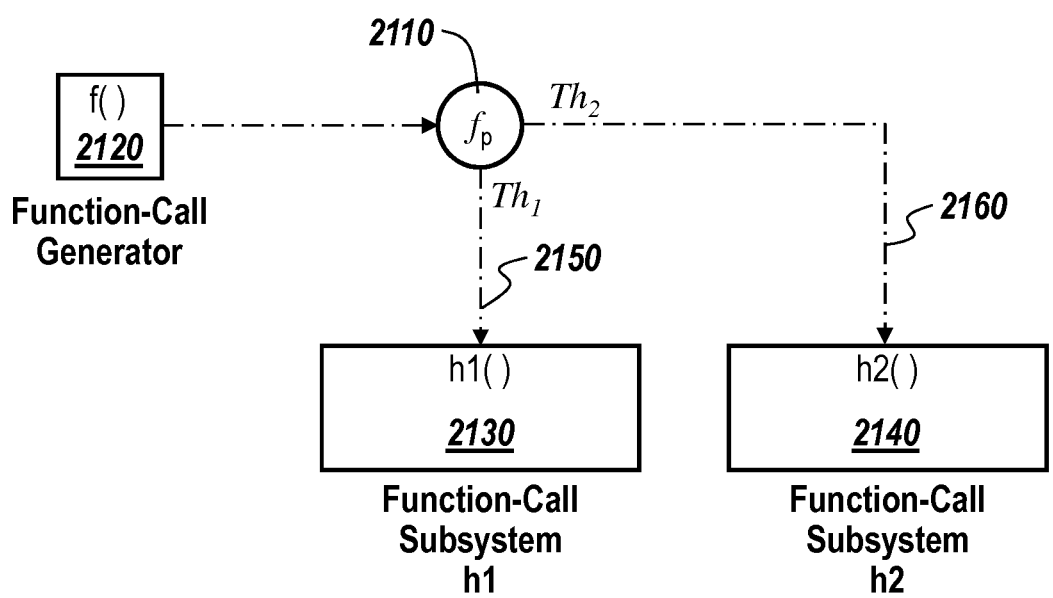
FIG. 21—illustrates an embodiment of a Function-Call Split block that invokes Function-Call Subsystems in parallel on new threads.

In FIG. 21, there are no data dependencies and computations performed by the Function-Call Subsystems h1 2130 and h2 2140 are independent.

To improve efficiency threads may be created at model start and the threads may remain active. The act of invoking function-call on another thread signals via a semaphore or other synchronization entity thus activating execution of the subordinate function-call subsystem.

The term thread within the context of FIG. 21 refers to a separate thread of execution. In one implementation, the separate thread of execution can be a child thread of the process executing the model. Alternatively, the term thread can also mean a separate process running on the same computer or a process on a different computer. Generally, child threads of the current process are preferred because they use fewer resources. However, separate processes for the execution threads are required on some systems that don't support child threads within a process. There are numerous other reasons for using separate processes such as increased parallelism by leveraging multiple computers or multiple heterogeneous cores on a multicore system. In this case, a message passing interconnect is setup to communicate between the processes.

Figure 22:
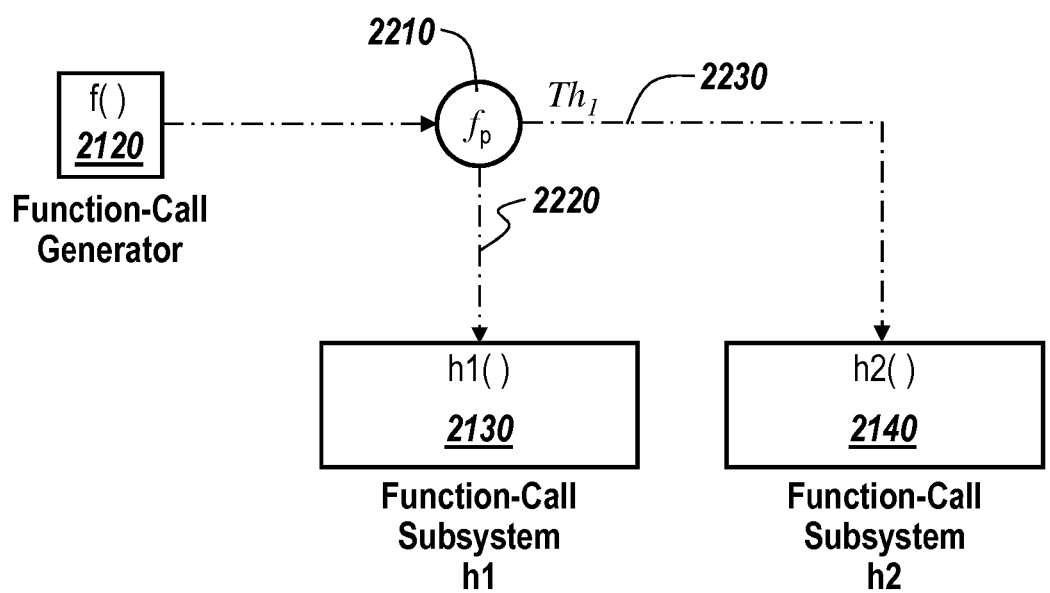
FIG. 22—illustrates an embodiment of a Function-Call Split block that invokes one of the Function-Call Subsystems on a new thread.

A parameter of Function-Call Split block 2110 can specify that the subordinate controlled blocks, namely h1 2130 and h2 2140, execute in new threads as shown in FIG. 21. In another embodiment, a user may specify that none or a subset of the subordinate controlled blocks execute in new threads. For example and referring to FIG. 22, h1 2130 executes in the same thread as the control initiator 2120 (Function-Call Generator) and h2 2140 executes in a new thread labeled, Th1 2230. One advantage of having h1 2130 run in the same thread of execution as the main model is that fewer resources will be used while still ensuring that both h1 2130 and h2 2140 do run in parallel.

Figure 23:
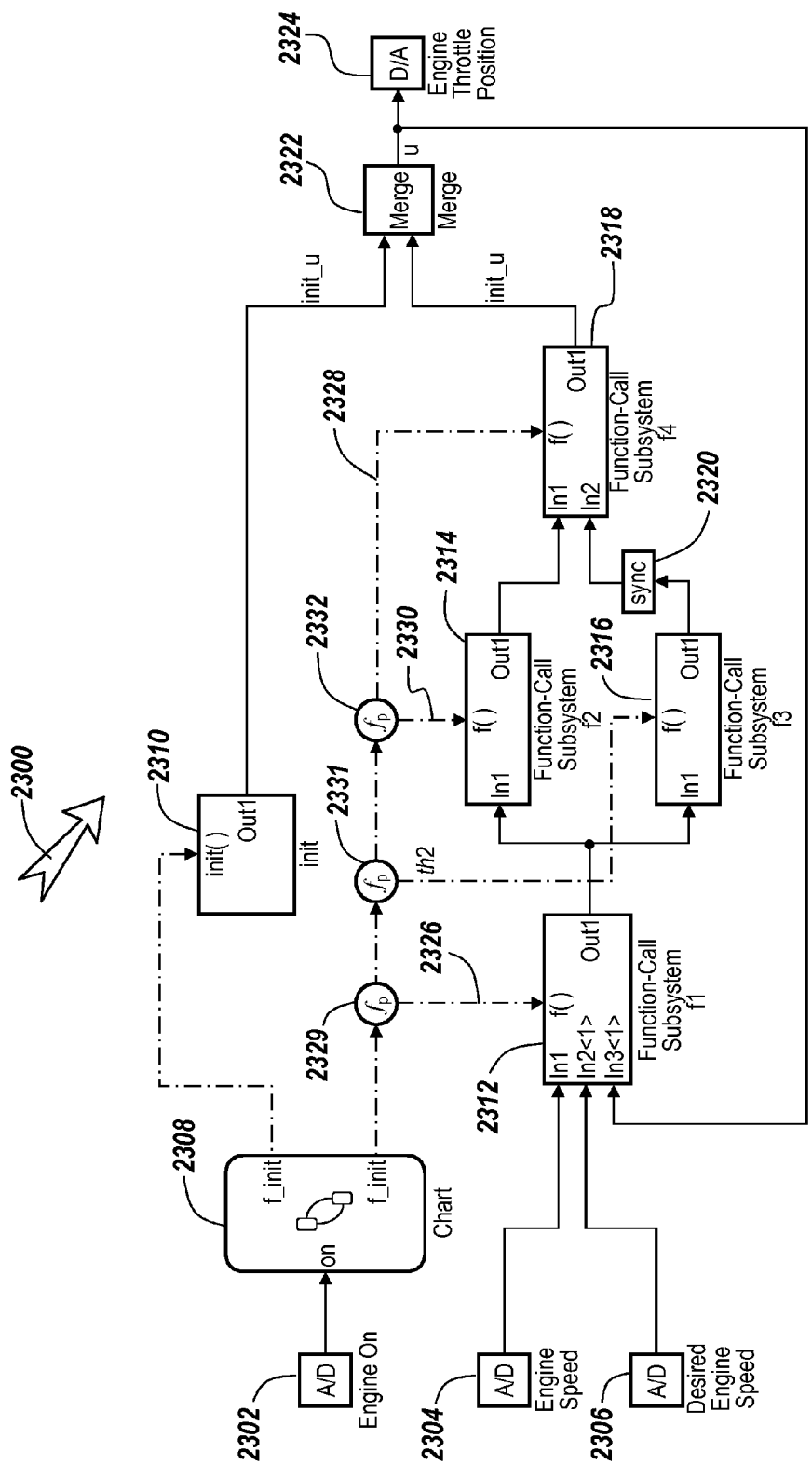
FIG. 23—illustrates an embodiment of a subgraphs that are explicitly controlled while honoring data dependencies and the subgraph consists of Function-Call Split block that invokes one of the Function-Call subsystems in another thread, where the another thread is synchronized with the main thread via a Function-Call Sync block.

Threading may introduce a new constraint on data signals, such as the need to ensure deterministic execution. For example and considering FIG. 23, model 2300 may represent an engine controller. In model 2300 there are three analog-to-digital (A/D) converters. The Engine On A/D converter 2302 detects when the engine is to be controlled to the desired speed as provided to model 2300 via the Desired Engine Speed A/D converter 2306. The Engine Speed A/D converter 2304 provides the current engine speed. The chart block 2308 is responsible for running either the init Function-Call Subsystem 2310 or the subgraph defined by the three function call branch blocks 2329, 2331, and 2332, the Function-Call Subsystems, f1 2312, f2 2314, f3 2316, and f4 2318 and the sync block 2320 (or more formally a data synchronization block). This subgraph is responsible for the "running" state of the engine where it computes the desired throttle position provided to the Engine Throttle Position D/A converter 2324 through the Merge block 2322. The init Function-Call Subsystem 2310 sets the desired throttle position when the system starts up by providing the value to the Engine Throttle Position D/A 2324 converter through the Merge block 2322. The Merge block 2322 outputs the merged signal of init_u or run_u. In FIG. 23 did not require a synchronization block between f1 2312 and f3 2316 which is running in a different thread because f1 will have finished execution before f3 starts running. This synchronization is achieved by 2329 which executes its bottom branch f1 2312 prior to executing is right-most branch 2331. It should also be clear to one skilled in the art that an incorrectly placed data synchronization block would result in an error. For example, if a data synchronization block were placed on the In1 signal feeding 2316, then during model analysis an error would be produced.

In FIG. 23, the Function-Call Subsystem f3 2316 is executing in a child thread (th2) 2326 and thus the Function-Call Subsystems f2 2314 and f3 2316 run in parallel. In the embodiment of FIG. 23, parallel execution increases the processing speed of the system for the automobile. The sync block 2320 is a Function-Call Synchronization (or more generally a Control Signal Synchronization) block that is used to synchronize the child thread containing f3 with the main thread 2328. The Function-Call Subsystem f4 2318, cannot start processing until both f2 2134 and f3 2316 is complete. If Function-Call Subsystem f2 2314 finishes before f3 2316 is complete, then the sync block 2320 will cause the main thread 2328 to wait for the child thread 2330 of f2 2314. Once the child thread is complete, the right-most Function-Call Split block 2332 will invoke the Function-Call Subsystem f4 2318.

Figure 24:
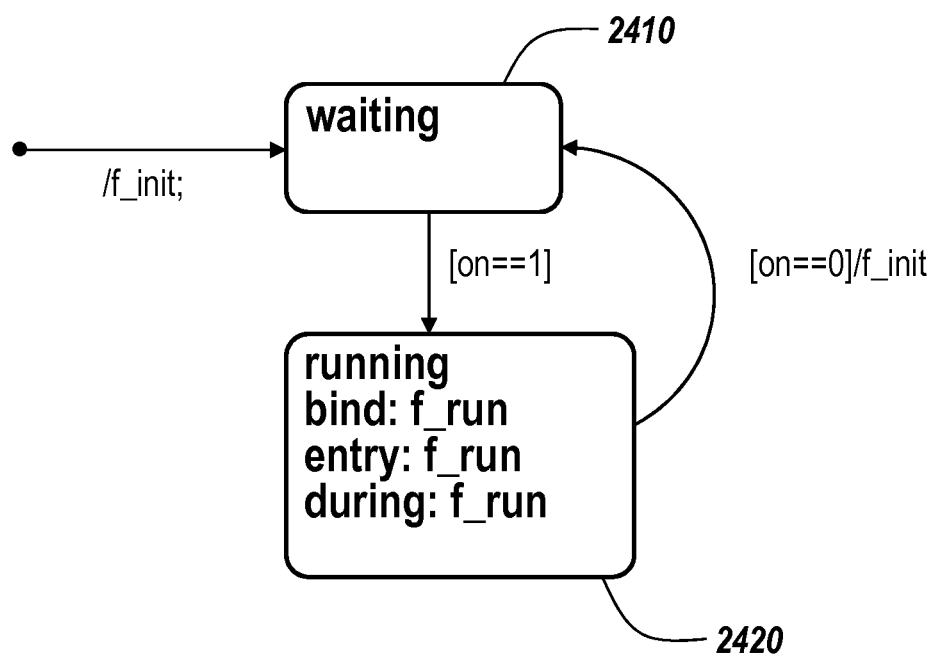
FIG. 24—illustrates an embodiment of a chart making a function-call.

The contents of the chart block 2308 are shown in FIG. 24. In FIG. 24, f_init function call is invoked at start up. Then the chart enters the waiting state 2410. When the "Engine On" (A/D) converter 2302 produces a 1, the chart will enter the running state 2420. In the running state 2420, the chart periodically executes the subgraph of FIG. 23 at a discrete-time (sampled) rate.

Figure 25:
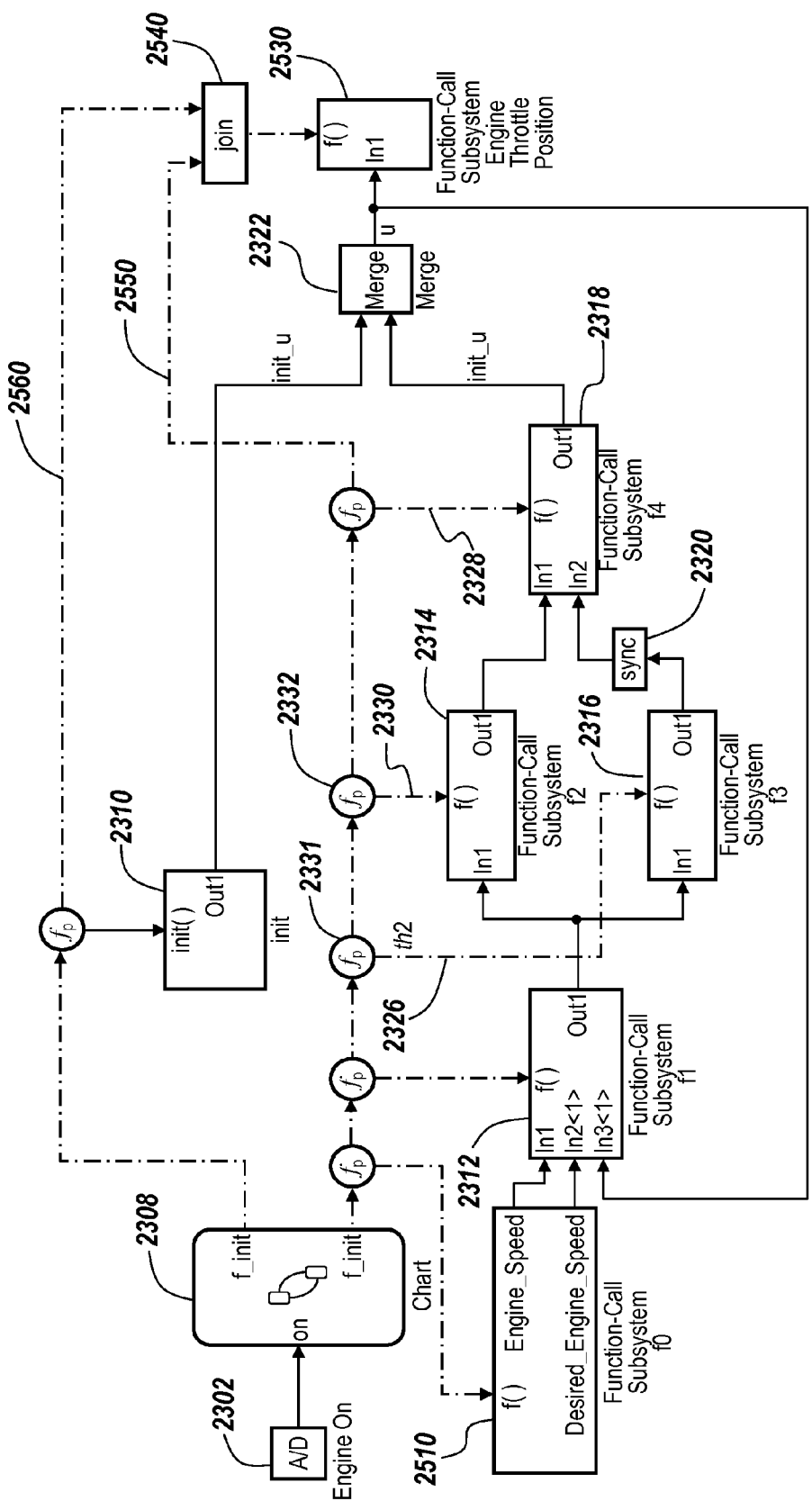
FIG. 25—illustrates an embodiment that includes subgraphs that are explicitly controlled while honoring data dependencies and where the subgraph consists of a Function-Call Split block that invokes one of the Function-Call subsystems in another thread, where the thread is then synchronized with the main thread via a Function-Call Sync block.

When FIG. 23 is examined, e.g., by a user or programmatically, it may be determined that efficiency can be improved by using function-call subsystems to control when the Engine Speed, Desired Engine Speed and Engine Throttle Position blocks run. In FIG. 23, these will run when the chart is in the waiting state. FIG. 25 illustrates an embodiment that can provide improved performance with respect to the embodiment of FIG. 23 by using function-call subsystems to control aspect of the system.

Figure 26:
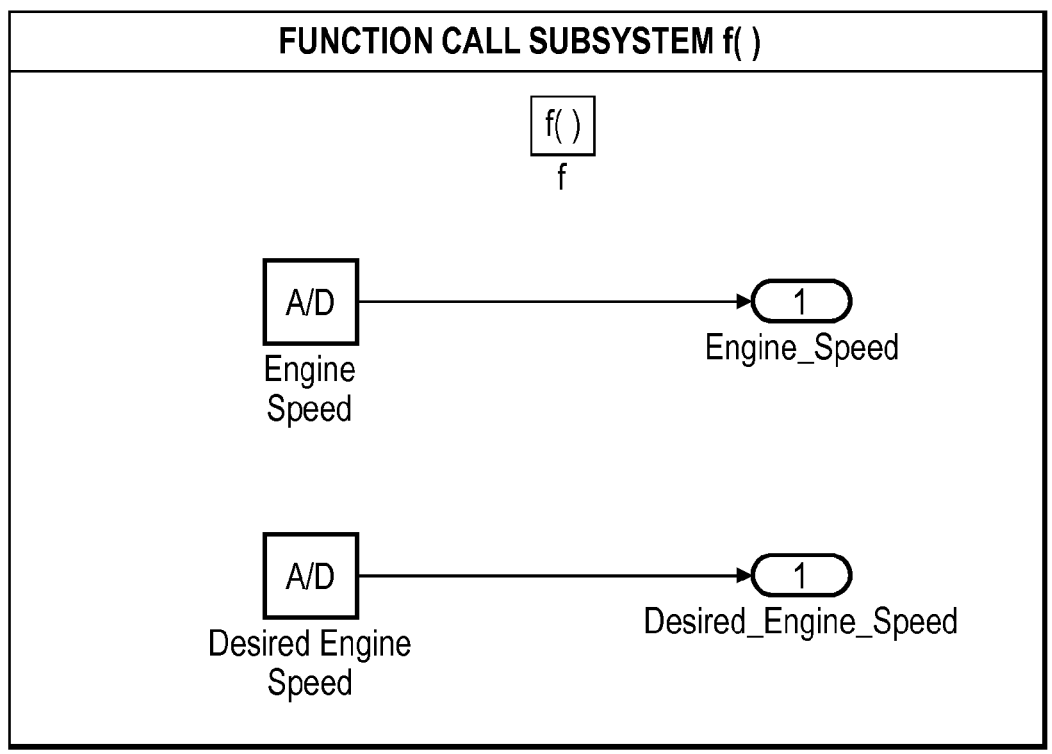
FIG. 26—illustrates an embodiment of a function-call subsystem from FIG. 25 containing source blocks that are executed when needed.
Figure 27:
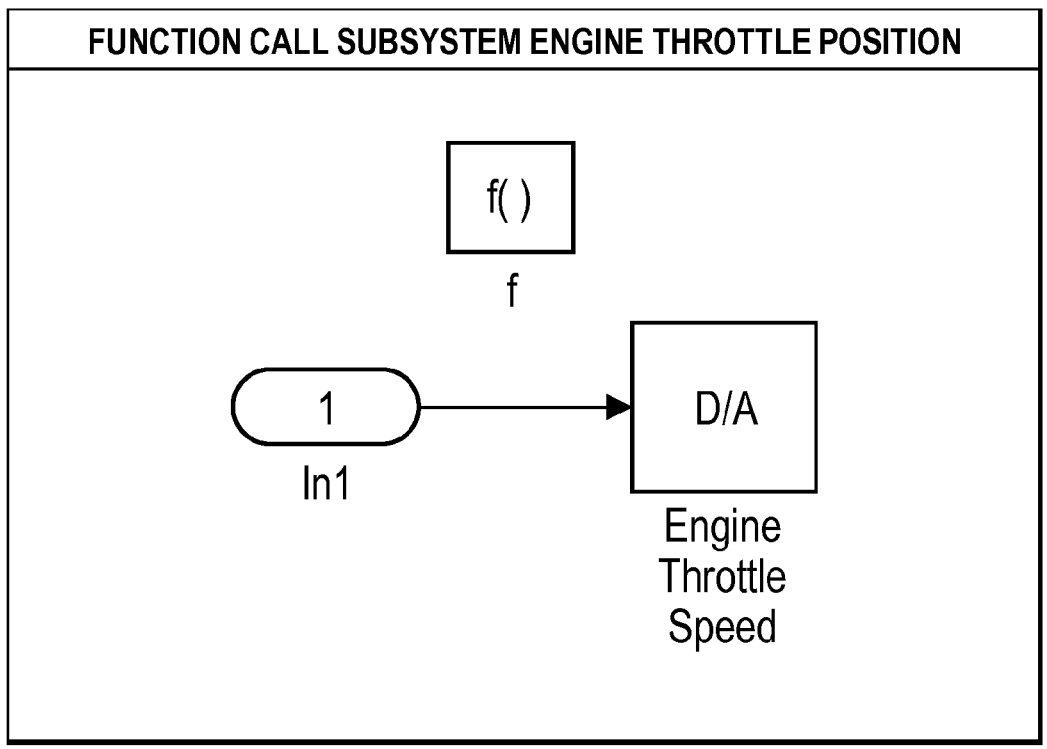
FIG. 27—illustrates an embodiment of a function-call subsystem from FIG. 25 containing sink blocks that are executed when needed.

In FIG. 25, the two source A/D converters of FIG. 24 (2304, 2306) have been placed into Function-Call Subsystem f0 2510 whose contents are show in FIG. 26. Referring to FIG. 25, The chart 2308, when in the running state, runs the f0 2510 first then runs f1 2312 to prefilter the input, then creates child thread, th2 2326 to run f3 2316 and at the same time runs f2 2314 in the main thread. Then f4 2318 runs after f2 2314 finishes and after f3 2316 finishes. The sync block 2320 ensures f3 2316 finishes. The Merge block 2322 merges the output of the init subsystem 2310 with the output of f4 2318. By definition the merge block 2322 is a virtual block meaning that it doesn't have any run-time behavior. Merge block 2322 ensures Out1 from the init subsystem 2310 and Out1 of f4 2318 occupy the same memory location. Because init 2310 and f4 2318 never execute on the same time step, the output of the Merge block 2322 represents the output of init 2310 or f4 2318 that ran last. The Merge block 2322 output is provided to the Function-Call Subsystem Engine Throttle Position block 2530. FIG. 27 illustrates the contents of block 2530. The join block 2540 is used to ensure block 2530 will only execute after init 2310 runs or after f4 2318 runs thus ensuring the D/A converter of FIG. 27 is only run when its input signal value may have changed.

Figure 28:
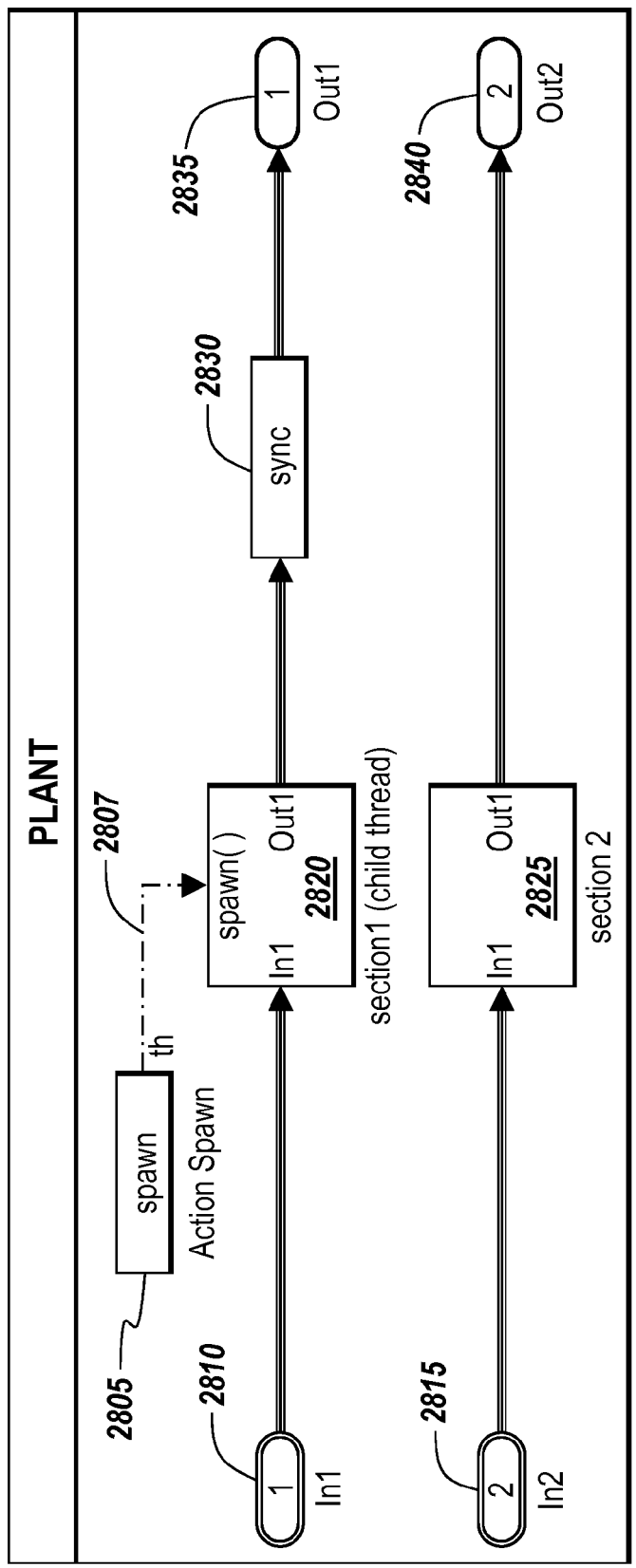
FIG. 28—illustrates an embodiment of a continuous-time system that uses a spawn block to speed up execution by running transformations in parallel.

Employing a Function-Call Split block operating in parallel mode is one way in which to spawn child threads of execution. The general concept may be referred to as spawn control signal initiator. One realization of the spawn control signal initiator is via the block illustrated in FIG. 28. FIG. 28 represents a model of a portion of an automotive engine (the plant). In FIG. 28, the plant may be modeled using time-based block diagram semantics such as continuous-time dynamics, hybrid (continuous+one or more discrete rates) dynamics, or discrete dynamics (one or more discrete rates). To improve execution speed, the plant is broken up into two sections and supporting blocks for those sections as shown in the figure.

In FIG. 28, the signals coming from the In1 and In2 Inport blocks 2810 and 2820, respectively, are in the main thread. The Spawn block 2805 creates a new thread (th) 2807. The section 1 subsystem 2820 contains blocks that transform the In1 signal into an output signal which is provided to a thread synchronization block 2830, sync. After the main thread starts executing the child thread, the main thread immediately continues to execute the subsystem defined by section 2 2825 this subsystem transforms the In2 signals and provides them to the Out2 block 2840.

If section 2 completes before section 1 is done, then the sync block 2830 will wait for section 1 2820 to complete. This ensures that both Out1 2835 and Out2 2840 are in the main thread. The implementation of the embodiment of FIG. 28 requires that the modeling environment produce a sorted list consisting having the following ordering: Action Spawn, Section 1, Section 2, and Sync. The requirements of the arrangement of FIG. 28 are that the sync block be placed as late as possible and that the Action spawn blocks 2805 be placed as early as possible. One means by which to achieve this is in the graph that is sorted, in the initial per-sort list, place the Action Spawn blocks 2805 first and the Sync blocks 2830 last. An alternative implementation for the sync block 2830 would be to have the users explicitly draw a dependency signal from the output of section 2 2825 to the input of the sync block 2830. This signal would visually show the execution dependency and eliminate the need to explicitly pre-sort sync blocks last before sorting the graph defined by the blocks.

If the Spawn block were not present, the model in FIG. 28 would produce an error when the model is analyzed by the simulation/execution engine.

In addition, to having the Synchronization block synchronize threads, the Synchronization block may also include a timeout threshold, wherein if the subgraph does not complete execution before the threshold is reached an error is detected. The error condition may be to stop execution and report an error or the spawn block can produce an error signal that is used by other blocks to programmatically take corrective action, thus ensuring the model continues to execute.

Explicit execution control description thus far has primarily focused on time-based graphical models such as the block diagrams found within Simulink. Explicit execution control can apply to many different graphical modeling environments, including, but not necessarily limited to, discrete event such as the models found within SimEvents and data flow modeling environments. One difference between data flow and time-based graphical models is that in most data flow modeling environments, the execution of blocks is defined by data availability rather than a time hit as in time-based systems. In a data flow model, control signals can be used to execute subgraphs and within the subgraphs data dependencies are honored using the capabilities and techniques described herein. In addition, the other capabilities including explicit signatures for components via Control Signal Proxy and Control Signal Proxy Adaptor blocks, threading, and data sync block, etc. are suitable for such environments.

Figure 29:
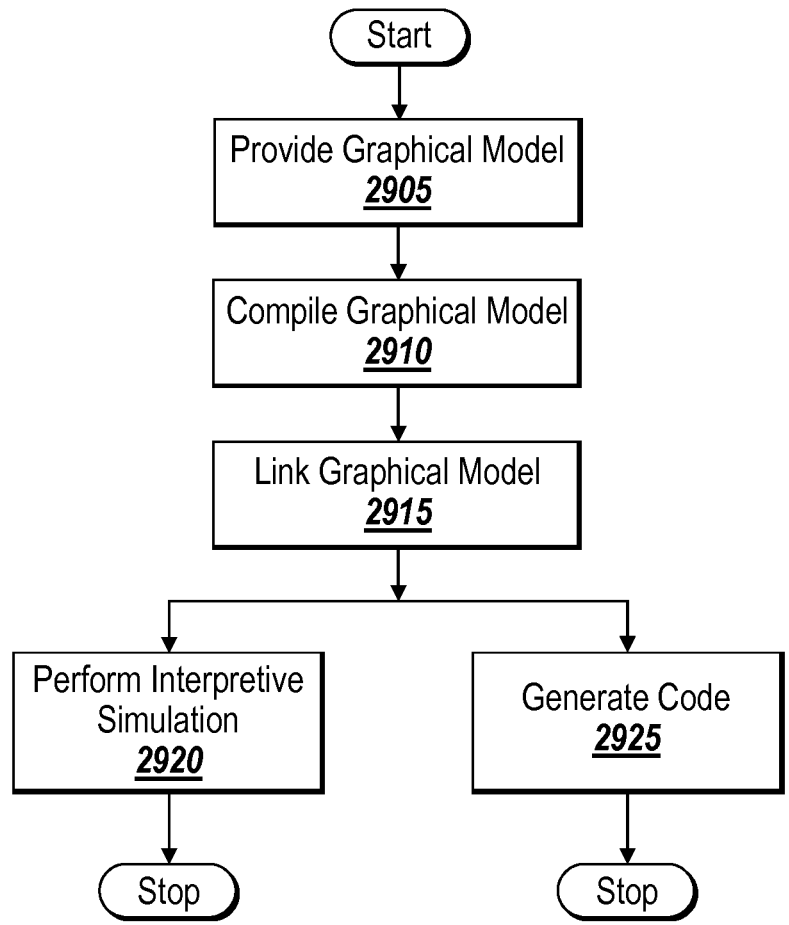
FIG. 29—illustrates an exemplary flow chart illustrating exemplary processing for implementing an embodiment of the invention.

FIG. 29 illustrates exemplary processing that can be performed using embodiments of the invention. Referring to FIG. 29, a time-based graphical model may be provided and may consist of a set of blocks connected by data signal lines (act 2905). Each block defines a dynamic system that is characterized by a set of equations defined by system theory including but not limited to initialization, pre_execute, output, update, derivative, termination run-time functions. The model may be converted into an executable form to analyze the model or compile it (act 2910). Model compilation consists of sorting the blocks according to data dependencies. In an embodiment, sorting may be performed using a variant of depth first sorting that handles strongly connected components. Using the compiled information, the model may be linked via a link phase that generates block function execution lists from the sorted-list, one for each block run-time function of a given rate (sample time) (act 2915).

Before running a simulation or generating code, the initialize functions are called to setup the system state. In an interpretive simulation, the block run-time functions are executed in a simulation loop using the block function execution lists, where the output functions are executed first, and then the update functions for discrete states are executed (act 2920). Finally integration of the continuous states is computed by integrating the derivatives and time is advanced.

The addition of control signals to a time-based graphical model is handled during compilation by ignoring these signals for the block sorting based on data dependencies. Each control signal initiator is provided with objects it can use to run functions on the connected subgraph. For example a Stateflow chart with a function-call control signal output may be connected to a Function-Call Split block. The chart will be provided with an object that can be used to run the various runtime methods associated with the control signal. If the Function-Call Split block is connected to a Function-Call Subsystems, then the object will aggregate the run-time methods of both subsystems.

In stead of using an interpretive simulation, generated code can by produced from the graphical model (act 2925). Code generation is performed by using the sorted list and the results of initialization to create an intermediate representation that is transformed to generated code such as C or C++. Alternatively, hardware can be synthesized from the model by producing code that conforms to a hardware description language HDL such as Verilog.

Figure 30:
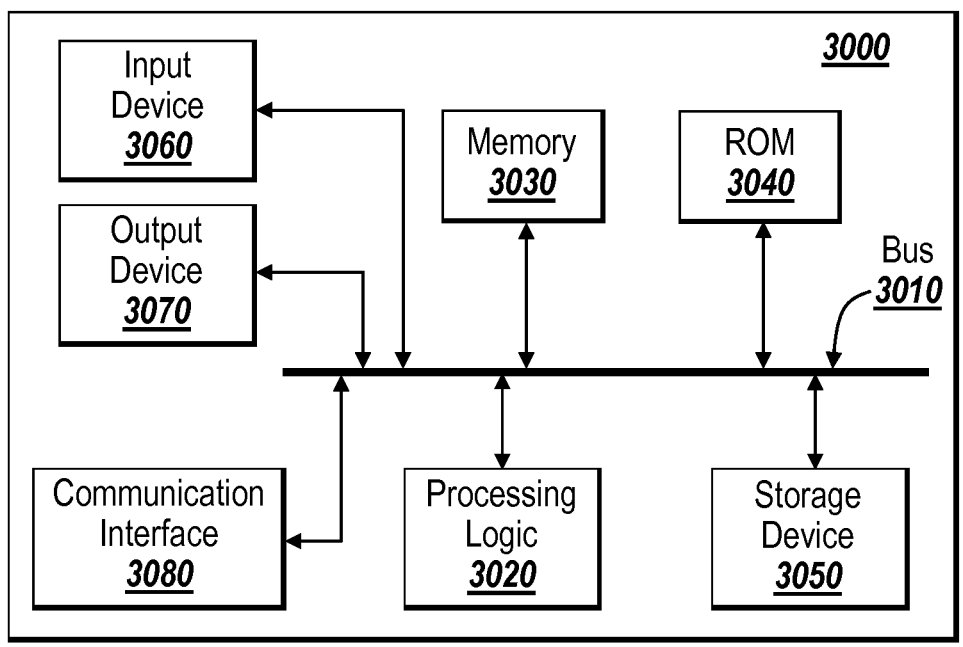
FIG. 30—illustrates an exemplary computing architecture for implementing an embodiment of the invention.

FIG. 30 illustrates an exemplary computer architecture that can be used to implement computer 3000. FIG. 30 is an exemplary diagram of an entity corresponding to computer 3000. As illustrated, the entity may include a bus 3010, processing logic 3020, a main memory 3030, a read-only memory (ROM) 3040, a storage device 3050, an input device 3060, an output device 3070, and/or a communication interface 3080. Bus 3010 may include a path that permits communication among the components of the entity.

Processing logic 3020 may include a processor, microprocessor, or other types of processing logic that may interpret and execute instructions. In one implementation, processing logic 3020 may include a single core processor or a multi-core processor. In another implementation, processing logic 3020 may include a single processing device or a group of processing devices, such as a processor cluster or computing grid. In still another implementation, processing logic 3020 may include multiple processors that may be local or remote with respect each other, and may use one or more threads while processing.

Main memory 3030 may include a random access memory (RAM) or another type of dynamic storage device that may store information and instructions for execution by processing logic 3020. ROM 3040 may include a ROM device or another type of static storage device that may store static information and/or instructions for use by processing logic 3020. Storage device 3050 may include a magnetic, solid state and/or optical recording medium and its corresponding drive, or another type of static storage device that may store static information and/or instructions for use by processing logic 3020.

Input device 3060 may include logic that permits an operator to input information to the entity, such as a keyboard, a mouse, a pen, a touchpad, an accelerometer, a microphone, voice recognition, camera, neural interface, biometric mechanisms, etc. Output device 3070 may include a mechanism that outputs information to the operator, including a display, a printer, a speaker, etc. Communication interface 3080 may include any transceiver-like logic that enables the entity to communicate with other devices and/or systems. For example, communication interface 3080 may include mechanisms for communicating with another device or system via a network.

The entity depicted in FIG. 30 may perform certain operations in response to processing logic 3020 executing software instructions contained in a computer-readable medium, such as main memory 3030. A computer-readable medium may be defined as a physical or logical memory device. The software instructions may be read into main memory 3030 from another computer-readable storage medium, such as storage device 3050, or from another device via communication interface 3080. The software instructions contained in main memory 3030 may cause processing logic 3020 to perform processes described herein when the software instructions are executed on processing logic. Alternatively, hardwired circuitry may be used in place of or in combination with software instructions to implement processes described herein. Thus, implementations described herein are not limited to any specific combination of hardware circuitry and software.

Although FIG. 30 shows exemplary components of the entity, in other implementations, the entity may contain fewer, different, or additional components than depicted in FIG. 30. In still other implementations, one or more components of the entity may perform one or more tasks described as being performed by one or more other components of the entity.

Figure 31:
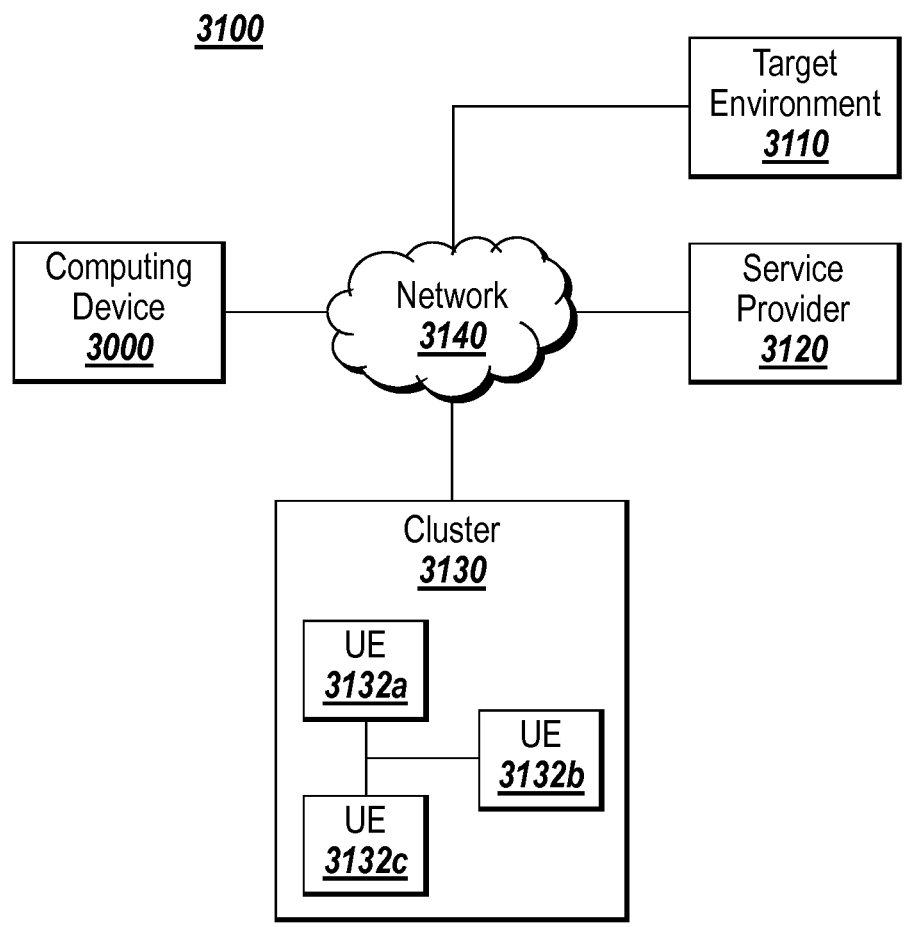
FIG. 31—illustrates an exemplary distributed processing architecture for implementing an embodiment of the invention.

One or more embodiments of the invention may be implemented in a distributed environment. FIG. 31 illustrates an example of a distributed environment 3100 that may be configured to implement one or more embodiments of the invention. Referring to FIG. 31, environment 3100 may contain various entities including computing device 3000, target environment 3110, service provider 3120, cluster 3130, and network 3140. Note that the distributed environment 3100 is just one example of a distributed environment that may be used with embodiments of the invention. Other distributed environments that may be used with embodiments of the invention may contain more entities, fewer entities, entities in arrangements that differ from the arrangement illustrated in FIG. 31. Moreover, the distributed environments may be configured to implement various cloud computing frameworks.

Details of computing device 3000 were described above with respect to FIG. 30. In distributed environment 3100, computing device 3000 may be configured to, among other things, exchange information (e.g., data) with other entities on network 3140 (e.g., target environment 3110, service provider 3120, and cluster 3130). Computing device 3000 may interface with the network 3140 via communication interface 180.

Target environment 3110 may be configured to execute and/or interpret a compiled version of a model, which may be generated in or otherwise available to the distributed environment 3100. The network 3140 may include a communication network capable of exchanging information between the entities in the network 3140. The network 3140 may include digital and/or analog aspects. The information may include machine-readable information having a format that may be adapted for use, for example, in the network 3140 and/or with one or more entities in the network 3140. For example, the information may be encapsulated in one or more packets that may be used to transfer the information through the network 3140.

Information may be exchanged between entities using various network protocols, such as, but not limited to, the Internet Protocol (IP), Asynchronous Transfer Mode (ATM), Synchronous Optical Network (SONET), the User Datagram Protocol (UDP), Transmission Control Protocol (TCP), Institute of Electrical and Electronics Engineers (IEEE) 802.11, etc.

The network 3140 may include various network devices, such as gateways, routers, switches, firewalls, servers, repeaters, address translators, etc. Portions of the network 3140 may be wired (e.g., using wired conductors, optical fibers, etc.) and/or wireless (e.g., using free-space optical (FSO), radio frequency (RF), acoustic transmission paths, etc.). Portions of network 3140 may include a substantially open public network, such as the Internet. Portions of network 3140 may include a more restricted network, such as a private corporate network or virtual private network (VPN).

It should be noted that implementations of networks and/or devices operating on networks described herein are not limited with regards to, for example, information carried by the networks, protocols used in the networks, and/or the architecture/configuration of the networks.

Service provider 3120 may include logic that makes a service available to another entity in the distributed environment 3100. Service provider 3120 may also include a server operated by, for example, an individual, a corporation, an educational institution, a government agency, and so on, that provides one or more services to a destination, such as computing device 3000. The services may include software containing computer-executable instructions that implement one or more embodiments of the invention or portions thereof, and may be executed, in whole or in part, by (1) a destination, (2) the service provider 3120 on behalf of the destination, or (3) some combination thereof.

For example, in an embodiment, service provider 3120 may provide one or more subscription-based services that may be available to various customers. The services may be accessed by a customer via network 3140. The customer may access the services using a computer system, such as computing device 3000. The services may include services that implement one or more embodiments of the invention or portions thereof. Service provider 3120 may limit access to certain services based on, e.g., a customer service agreement between the customer and service provider 3120.

The service agreement may allow the customer to access the services that may allow the customer to build, execute, and/or analyze a model, such as model 300, as described above. The service agreement may include other types of arrangements, such as certain fee-based arrangements or restricted access arrangements. For example, a customer may pay a fee which provides the customer unlimited access to a given package of services for a given time period (e.g., per minute, hourly, daily, monthly, yearly, etc.). For services not included in the package, the customer may have to pay an additional fee in order to access the services. Still other arrangements may be resource-usage based. For example, the customer may be assessed a fee based on an amount of computing resources and/or network bandwidth used.

Cluster 3130 may include a number of units of execution (UEs) 3132 that may perform processing of one or more embodiments of the invention or portions thereof on behalf of computing device 3000 and/or another entity, such as service provider 3120. The UEs 3132 may reside on a single device or chip or on multiple devices or chips. For example, the UEs 3132 may be implemented in a single ASIC or in multiple ASICs. Likewise, the UEs 3132 may be implemented in a single computer system or multiple computer systems. Other examples of UEs 3132 may include FPGAs, CPLDs, ASIPs, processors, multiprocessor systems-on-chip (MPSoCs), graphic processing units, microprocessors, etc. The UEs 3132 may be configured to perform operations on behalf of another entity.

Exemplary embodiments may include or may be implemented in a technical computing environment that includes hardware and/or hardware-software based logic. The logic may provide a computing environment that allows users to perform tasks related to disciplines, such as, but not limited to, mathematics, science, engineering, medicine, business, etc., more efficiently than if the tasks were performed in another type of computing environment, such as an environment that required the user to develop code in a conventional programming language, such as C++, C, Fortran, Pascal, etc. In one implementation, the technical computing environment may include a dynamically typed language that can be used to express problems and/or solutions in mathematical notations familiar to those of skill in the relevant arts. For example, the technical computing environment may use an array as a basic element, where the array may not require dimensioning. These arrays may be used to support array programming in that operations can apply to an entire set of values, such as values in an array. Array programming may allow array based operations to be treated as a high-level programming technique or model that lets a programmer think and operate on whole aggregations of data without having to resort to explicit loops of individual non-array, i.e., scalar operations.

The technical computing environment may further be adapted to perform matrix and/or vector formulations that can be used for data analysis, data visualization, application development, simulation, modeling, algorithm development, etc. These matrix and/or vector formulations may be used in many areas, such as statistics, finance, image processing, signal processing, control design, life sciences, education, discrete event analysis and/or design, state based analysis and/or design, etc.

The technical computing environment may further provide mathematical functions and/or graphical tools (e.g., for creating plots, surfaces, images, volumetric representations, etc.). In one implementation, the technical computing environment may provide these functions and/or tools using toolboxes (e.g., toolboxes for signal processing, image processing, data plotting, parallel processing, optimization, etc.). In another implementation, the technical computing environment may provide these functions as block sets (e.g., an optimization block set). In still another implementation, the technical computing environment may provide these functions in another way, such as via a library, etc. The technical computing environment may be implemented as a text based environment, a graphically based environment, or another type of environment, such as a hybrid environment that is both text and graphically based.

For example, a text-based embodiment may implement the technical computing environment using one or more text-based products. For example, a text-based technical computing environment (TCE), may be implemented using products such as, but not limited to, MATLAB® by The MathWorks, Inc.; Octave; Python; Comsol Script; MATRIXx from National Instruments; Mathematica from Wolfram Research, Inc.; Mathcad from Mathsoft Engineering & Education Inc.; Maple from Maplesoft; Extend from Imagine That Inc.; Scilab from The French Institution for Research in Computer Science and Control (INRIA); Virtuoso from Cadence; or Modelica or Dymola from Dynasim. The text-based TCE may support one or more commands that support remote processing using one or more units of execution or other types of remote processing devices.

A graphically-based embodiment may implement the technical computing environment in a graphically-based technical computing environment using products such as, but not limited to, Simulink®, Stateflow®, SimEvents™, etc., by The MathWorks, Inc.; VisSim by Visual Solutions; LabView® by National Instruments; Dymola by Dynasim; SoftWIRE by Measurement Computing; WiT by DALSA Coreco; VEE Pro or SystemVue by Agilent; Vision Program Manager from PPT Vision; Khoros from Khoral Research; Gedae by Gedae, Inc.; Scicos from (INRIA); Virtuoso from Cadence; Rational Rose from IBM; Rhopsody or Tau from Telelogic; Ptolemy from the University of California at Berkeley; or aspects of a Unified Modeling Language (UML) or SysML environment. The graphically-based TCE may support remote processing using one or more units of execution or other types of remote processing devices. Implementations may provide a modeling environment that allows states to be implicitly reset while a model executes.

The foregoing description of exemplary embodiments of the invention provides illustration and description, but is not intended to be exhaustive or to limit the invention to the precise form disclosed. Modifications and variations are possible in light of the above teachings or may be acquired from practice of the invention. For example, while a series of acts has been described with regard to FIG. 29, the order of the acts may be modified in other implementations consistent with the principles of the invention. Further, non-dependent acts may be performed in parallel.

In addition, implementations consistent with principles of the invention can be implemented using devices and configurations other than those illustrated in the figures and described in the specification without departing from the spirit of the invention. Devices and/or components may be added and/or removed from the implementations of FIGS. 30 and 31 depending on specific deployments and/or applications. Further, disclosed implementations may not be limited to any specific combination of hardware. Further, certain portions of the invention may be implemented as "logic" that performs one or more functions. This logic may include hardware, such as hardwired logic, an application-specific integrated circuit, a field programmable gate array, a microprocessor, software, or a combination of hardware and software.

No element, act, or instruction used in the description of the invention should be construed as critical or essential to the invention unless explicitly described as such. Also, as used herein, the article "a" is intended to include one or more items. Where only one item is intended, the term "one" or similar language is used. Further, the phrase "based on," as used herein is intended to mean "based, at least in part, on" unless explicitly stated otherwise.

Headings and sub-headings used herein are to aid the reader by dividing the specification into subsections. These headings and sub-headings are not to be construed as limiting the scope of the invention or as defining the invention.

The scope of the invention is defined by the claims and their equivalents.

What is claimed is:

1. A computer-implemented method in a graphical modeling environment, the method comprising:
   providing a control initiator, where the control initiator provides a control signal to a control signal splitter, where:
      the control initiator is a block that uses a control signal to explicitly control execution of one or more subgraphs, and
      the control signal splitter accepts the control signal from the control initiator and splits the control signal into a first split control signal and a second split control signal;
   providing a first subgraph in the modeling environment, where:
      the first subgraph includes one or more blocks, and
      the first subgraph is connected to the control signal splitter;
   providing a second subgraph in the modeling environment, where:
      the second subgraph includes one or more blocks, and
      the second subgraph is connected to the control signal splitter;
   executing the first subgraph in a first thread to produce a first result when the first subgraph receives the first split control signal from the control signal splitter; and
   executing the second subgraph in a second thread to produce a second result when the second subgraph receives the second split control signal from the control signal splitter and where:
      the first split control signal and the second split control signal are output from the control signal splitter in an order that honors data dependencies from the first subgraph and second subgraph.

2. The method of claim 1, further comprising:
   providing a data synchronization block; and
   maintaining data integrity between the first thread and the second thread using the data synchronization block.

3. The method of claim 1, where the first thread is a calling thread and the second thread is a new thread called by the calling thread.

4. The method of claim 1, where the second thread is the calling thread and the first thread is a new thread called by the calling thread.

5. The method of claim 1, further comprising:
   providing a calling thread.

6. The method of claim 5, further comprising:
   calling the first thread using the calling thread; and
   calling the second thread using the calling thread.

7. The method of claim 1, further comprising a second control signal splitter, the second control signal splitter connected to the control signal splitter.

8. The method of claim 1, where the control signal splitter splits the control signal into more than two output control signals.

9. The method of claim 1, where the control initiator is a state chart.

10. The method of claim 1, where the model is a time-based model, a data flow model, or an event-based model.

11. The method of claim 1, where the control signal is a function-call or an action signal.

12. The method of claim 1, where the model includes one or more data signals.

13. A non-transitory computer-readable medium holding executable instructions that when executed on a processor control subgraph execution in a model, the medium holding one or more instructions for:
   providing a control initiator, where the control initiator provides a control signal to a control signal splitter where:
      the control initiator is a block that uses a control signal to explicitly control execution of one or more subgraphs, and
      the control signal splitter accepts the control signal from the control initiator and splits the control signal into a first split control signal and a second split control signal;
   providing a first subgraph in the modeling environment, where:
      the first subgraph includes one or more blocks, and
      the first subgraph is connected to the control signal splitter;
   providing a second subgraph in the modeling environment, where:
      the second subgraph includes one or more blocks, and
      the second subgraph is connected to the control signal splitter;
   executing the first subgraph in a first thread to produce a first result when the first subgraph receives the first split control signal from the control signal splitter; and
   executing the second subgraph in a second thread to produce a second result when the second subgraph receives the second split control signal from the control signal splitter and where:

the first split control signal and the second split control signal are output from the control signal splitter in an order that honors data dependencies from the first subgraph and second subgraph.

* * * * *

UNITED STATES PATENT AND TRADEMARK OFFICE
CERTIFICATE OF CORRECTION

PATENT NO. : 8,549,470 B2  
APPLICATION NO. : 12/634500  
DATED : October 1, 2013  
INVENTOR(S) : John E. Ciolfi et al.

Page 1 of 1

It is certified that error appears in the above-identified patent and that said Letters Patent is hereby corrected as shown below:

In the Specification

Column 8, line 19, change "can" to --and can be--.

Column 12, line 55, change "illustrate" to --illustrated--.

Column 12, line 64, after "have" change "to" to --the--.

Column 13, line 56, change "sine wave" to --Sine Wave--.

Column 16, line 23, after "used" insert --to--.

Column 17, line 29, after "have" delete "an".

Column 20, line 1, change "per-sort" to --pre-sort--.

Signed and Sealed this  
Eighteenth Day of March, 2014

Michelle K. Lee  
*Deputy Director of the United States Patent and Trademark Office*